(12) United States Patent
Murphy

(10) Patent No.: US 7,042,952 B1
(45) Date of Patent: May 9, 2006

(54) METHODS AND APPARATUSES FOR RECEIVING AND TRANSMITTING SIGNALS

(75) Inventor: Michael C. Murphy, Malden, MA (US)

(73) Assignee: Custom One Design, Inc., Melrose, MA (US)

( * ) Notice: Subject to any disclaimer, the term of this patent is extended or adjusted under 35 U.S.C. 154(b) by 822 days.

(21) Appl. No.: 09/781,459

(22) Filed: Feb. 12, 2001

(51) Int. Cl.
*H04B 15/00* (2006.01)

(52) U.S. Cl. ...................................................... 375/258
(58) Field of Classification Search ...................... None
See application file for complete search history.

(56) References Cited

U.S. PATENT DOCUMENTS

| | | | |
|---|---|---|---|
| 5,796,598 A * | 8/1998 | Nowak et al. ................ | 363/37 |
| 5,796,781 A * | 8/1998 | DeAndrea et al. ........... | 375/288 |
| 5,896,417 A * | 4/1999 | Lau ............................... | 375/258 |
| 6,175,195 B1 * | 1/2001 | Janczak et al. ............... | 315/194 |
| 6,249,447 B1 * | 6/2001 | Boylan et al. ................ | 363/97 |
| 6,327,309 B1 * | 12/2001 | Dreyer et al. ................ | 375/258 |
| 6,356,582 B1 * | 3/2002 | Mazer et al. ................ | 375/219 |
| 6,370,187 B1 * | 4/2002 | Agah .......................... | 375/219 |
| 6,614,288 B1 * | 9/2003 | Dagan et al. ................ | 327/365 |
| 6,628,165 B1 * | 9/2003 | Henderson et al. ........... | 330/85 |
| 6,684,065 B1 * | 1/2004 | Bult et al. ................. | 455/252.1 |
| 6,731,098 B1 * | 5/2004 | Hintz et al. .................... | 322/44 |
| 6,738,601 B1 * | 5/2004 | Rofougaran et al. ......... | 455/66.1 |

* cited by examiner

*Primary Examiner*—Kenneth Vanderpuye
*Assistant Examiner*—Dung X Nguyen
(74) *Attorney, Agent, or Firm*—Burns & Levinson LLP; Jacob N. Erlich; John A. Hamilton

(57) ABSTRACT

Circuitry for transmitting signals through a transformer has an output transistor and circuitry which provides a controlled current to and from the output transistor's gate, so as to charge and discharge the gate's parasitic capacitance and increase and decrease the transistor's output current in a controlled manner. Feedback can be used to sense an output signal created by the transistor and turn off current to or from the transistor's gate when the output signal has reached a desired level. The output signal can be the voltage differential produced across an output transformer, and, where the output transformer is center-tapped, it can be the voltage differential across both halves of the center tapped winding.

49 Claims, 12 Drawing Sheets

METHODS AND APPARATUSES FOR RECEIVING AND TRANSMITTING SIGNALS

FIELD OF THE INVENTION

This invention relates generally to transmitters, receivers, and transceivers for transmitting and receiving digital information between two or more digital devices. Certain aspects of the invention relate to solid state receivers, transmitters, and transceiver, including largely, or totally, monolithic devices fabricated on a single semiconductor die.

BACKGROUND OF THE INVENTION

In many fields of communication between two or more computers such as those used in military avionics, tanks, howitzer systems and the like wherein digital and analog information must be processed between computers, it has been a common practice to drive the inputs of a transmitter section of one transceiver with digital data which is then appropriately processed in the transmitter and used in turn to drive an output transformer. This output transformer may be connected in one of several available transformer configurations, and the output transformer is in turn connected to a standard bus line and data link and is operative to convert the digital data to an analog voltage of a specified wave shape, waveform timing and power level. These later parameters must be sufficient to properly transmit the analog data from the transceiver over the bus line and to a similar transceiver located at a remote computer within the particular communication system.

For example, in certain military aircraft avionics systems, there might be one such computer in the aircraft cockpit to provide pilot information from another remotely located computer operative for providing various aircraft operational parameters such as speed, direction, fuel levels, temperatures, wind velocities and the like. These two physically separated computers would therefore each be equipped with one or more transceivers which are connected over relatively short data bus links typically on the order of 300 feet or less.

In the past, it has been a common practice to use several hybrid connections in the fabrication of a transceiver of the type described above. This practice required that a common insulating substrate such as a ceramic material be used to support and provide electrical interconnections between various components on the substrates such as one or more integrated circuit die, discrete capacitors, thin film resistors, and the like. The requirement for these hybrid circuit interconnections and associated fabrication assembly processes had the disadvantage of providing the additional space required to accommodate the substrate size, and more importantly the disadvantage of increased production costs and decreased device reliability associated with these hybrid fabrication and interconnection processes.

Two patents which illustrate prior art transceivers are U.S. Pat. No. 5,153,466 issued on Oct. 6, 1992 to Stein, et al., entitled "All Monolithic Transceiver Operative From A Low Voltage Vcc Dc Supply" (the "Stein Patent"); and U.S. Pat. No. 5,838,722 issued to Michael Consi on Nov. 17, 1998, entitled "Monolithic transceiver including feedback control" (the "Consi Patent"). Both the Stein Patent and the Consi Patent are hereby incorporated herein in their entirety by reference.

SUMMARY OF THE INVENTION

An object of one aspect of the present invention is to provide a solid state transmitter or transceiver which avoids undesirable current transients.

Another object of one aspect of the present invention is to provide a transmitter or transceiver which can be used with different types of transformers.

Yet another object of one aspect of the present invention is to provide a transmitter or transceiver which tends to cause the current flow which it drive in both directions across a transformer to be relatively equal, so as to prevent DC current through the transformer.

Still another object of one aspect of the present invention is to provide a transmitter, receiver, or transceiver which can better deal with voltage swings on the transformer to which it is connected.

Yet another object of one aspect of the present invention is to provide an operational amplifier, the output of which can more easily be used for different purposes.

Still another object of one aspect of the present invention is to provide a transmitter or transceiver which has protection from excessive current flows in its output transistors.

The objects set forth above as well as further and other objects and advantages of the present invention are achieved by the embodiments of the invention described below, as well as by other embodiments of the invention not shown.

According to one aspect of the invention, a transceiver for driving and receiving a signal through a transformer is provided. The transceiver has an FET power transistor having an output contact for conducting current to a coil of a transformer. The power transistor has a control gate with a parasitic capacitance. The transceiver also has a gate drive circuit which provides a controlled current flow to and from the gate, so as to charge and discharge the gate and its parasitic capacitance, and so as to increase and decrease the output current supplied by the output of the power transistor in a controlled manner. The drive circuit controls the current flow by causing a voltage level that drives the current to compensate for changes in the voltage on the gate so as to make the rate at which the current flows more even during the charging and discharging.

In some embodiments of this aspect of the invention there are two of the power transistors, each with an associated output contact. This includes a first power transistor for driving current across a transformer in a first direction during one part of an output signal cycle, and a second power transistor for driving current across the transformer in an opposite direction during another part of the output signal cycle. In such embodiments each of the two power transistors has a corresponding gate drive circuit for charging and discharging its control gate.

In some of these two power transistor embodiments the first and second power transistors are each one transistor of a first and second complimentary pair of power transistors, respectively. In such embodiments each complimentary pair includes two power transistors connected in series across a power supply with an associated output contact connected between them.

In some of these two power transistor embodiments each gate drive circuit uses a constant current source to charge its associated control gate during at least a majority of the charging of that gate.

In some of these two power transistor embodiments the transceiver includes a receiver input circuit, which has a pair of input connections for connection to each side of a transformer coil and for receiving the voltage differential across that coil. Circuitry provides an output measurement signal which varies as a function of the received voltage differential. Such transceivers further include a feedback circuit for stopping the current flow to the control gate of one of the power transistors driving current across the transformer when the output measurement signal indicates the received voltage differential has reached a desired level.

According to another aspect of the invention an output circuit for driving a signal includes an FET power transistor having an output contact and having a control gate with a parasitic capacitance. The output circuit has a gate drive circuit that provides a controlled current flow to and from the gate to charge and discharge the gate and its parasitic capacitance, so as to increase and decrease, respectively, the output signal supplied by the output of the power transistor at a controlled rate. The drive circuit controls the current flow by causing a voltage level that drives such current to compensate for changes in the voltage on the gate so as to make the rate at which such current flows more even during the charging and discharging. The output circuit also has feedback circuitry that senses the output signal and substantially stop current flow to or from a control gate when it senses that the output signal has reached a desired level.

In some embodiments of this aspect of the invention the output circuit is designed for driving an output signal on each of two output contacts so a differently phased version of the output signal is supplied to each such contact. In these embodiments there are at least two power transistors, a first for driving current corresponding to the output signal from its output contact in a first phase and a second power transistor for driving current corresponding to the output signal from its output contact in a second phase. Each of the first and second power transistors has a corresponding gate drive circuit for charging and discharging its control gate at a controlled rate.

In some of these dual phase embodiments, the feedback circuitry senses a voltage difference between the two differently phased outputs and substantially stops current to or from the control gate on one or more of the power transistors when it senses that the voltage difference has reached a desired level.

In some of these dual phase embodiments each of the gate drive circuits uses a substantially constant current source to charge its associated control gate during at least a majority of the time spent charging that gate.

According to another aspect of the invention a transceiver for driving and receiving a signal through a transformer is provided which includes: a pair of input connections for receiving an input signal from a transformer coil; receiver circuitry for amplifying the input signal and producing an amplified input signal; transmitter circuitry including one or more output transistors for driving an output signal; and pairs of output connections from which the output signal can be connected across the transformer coil, including a first pair for driving a center tapped transformer and a second pair for driving a bridge transformer.

In some embodiments of this aspect of the invention, at least a part of the transceiver is constructed as a single monolithic circuit that includes: the input connections; at least part of the receiver circuitry; at least part of the transmitter circuitry; and the first and second pair of output connections.

Some embodiments of this aspect of the invention include a center tapped transformer and the first pair of output connections are connected across that transformer to drive the output signal across it. In such embodiments the pair of input connections are connected across the center tapped transformer to receive the differential voltage across that transformer as the input signal; and the transceiver includes feedback circuitry for using a comparison between the amplified input signal and a desired signal level to control the amplitude of the output signal generated by the transmitter circuitry.

In some such embodiments having a center tapped transformer, each of the first pair of output connections has isolation circuitry for electrically isolating it from the transmitter circuitry during different portions of the output signal; and the output connections of the second pair of output connections do not have such isolation circuitry. In some such embodiments the transceiver's circuitry is designed to operate on a single polarity power supply.

In some such embodiments including a center tapped transformer, the transceiver is powered by a power supply having a given power supply voltage range; the receiver circuitry includes for each input connections an associated resistor and input operational amplifier. Each input connection is connected through its associated resistor to a virtual ground at one input to its associated input amplifier. The virtual ground at one input of each input amplifier is maintained through feedback current from the amplifier's output that causes a variable voltage drop through the associated resistor as the voltage on the associated input connection varies. Thus, even if a voltage received at an input connection ranges outside the power supply voltage range, the voltage at the virtual ground input into the associated input amplifier will remain substantially constant, and, thus, will remain within the power supply voltage range.

In some such embodiments the receiver circuitry includes circuitry for using the input amplifier feedback currents to generate an amplified input signal which varies as a function of the differential voltage across the transformer to which the input connections are connected. These embodiments including an output control feedback loop for responding to the difference between the amplified input signal and a desired signal level to control the amplitude of the output signal.

According to another aspect of the invention a transmitter for driving an output signal through a transformer is provided. This transmitter includes: transmitter circuitry including one or more output transistors for driving the output signal; and pairs of output connections from which the output signal can be connected across the transformer coil, including a first pair for driving a center tapped transformer and a second pair for driving a bridge transformer. Each of the first pair of output connections has isolation circuitry for electrically isolating it from the transmitter circuitry during a different portion of the output signal, whereas the output connections of the second pair of output connections do not have such isolation circuitry.

According to another aspect of the invention a transceiver for driving and receiving a signal through a transformer is provided which includes the following: a pair of input connections for receiving an input signal from a transformer coil; receiver circuitry for amplifying that input signal and producing an amplified input signal; transmitter circuitry including one or more output transistors for driving an output signal; pairs of output connections for connecting the output signal across the transformer coil, including a first pair for driving a center tapped transformer and a second pair for driving a bridge transformer; and feedback circuitry for using a comparison between the amplified input signal and a desired signal level to control the amplitude of the output signal. Each output connection of the first pair of output connections has isolation circuitry for electrically isolating it from the transmitter circuitry during a different portion of the output signal; and the output connections of the second pair of output connections do not have such isolation circuitry.

Some embodiments of this aspect of the invention include a center tapped transformer, and the first pair of output connections are connected across that transformer to drive the output signal across it; and the input connections are connected across the center tapped transformer to receive the differential voltage across it as the input signal.

According to another aspect of the invention a transmitter for driving an output signal through a transformer having a center tapped winding is provided. The transmitter includes: a pair of input connections for connection across the center tapped winding so as to receive the differential voltage across the winding; transmitter circuitry including one or more output transistors for driving an output signal; a pair of output connections from which the output signal can be connected across the center tapped winding of the transformer, where each output connection of the pair has isolation circuitry for electrically isolating it from the transmitter circuitry during a different portion of the output signal; and feedback circuitry for using a comparison between the received differential voltage and a desired signal level to control the amplitude of the output signal.

In some embodiments of this aspect of the invention such a transmitter is included in a transceiver for both driving and receiving signals through a center tapped transformer. The transceiver includes receiver circuitry connected to the pair of input connections for producing an amplified input signal which varies as a function of the received differential voltage.

In some embodiments of this aspect of the invention the one or more output transistors are FET transistors each having an output contact and a control gate with a parasitic capacitance. The transmitter circuitry includes a gate drive circuit that provides a controlled current flow to and from the gate of each output transistor to charge and discharge that gate and its parasitic capacitance, so as to increase and decrease the output signal supplied by the output contact of the output transistor. The drive circuit controls the current flow by causing the voltage level that drives such current to compensate for changes in the voltage on the gate so as to make the rate at which such current flows more even during the charging and discharging. The feedback circuitry substantially stops the flow of current to or from the control gate as a function of the comparison between the received differential voltage and the desired signal level.

According to another aspect of the invention a receiver for receiving a signal generated across a winding of a transformer is provided. The receiver includes: a pair of input connections for receiving a differential voltage input from opposite sides of the transformer winding; and a separate operational amplifier associated with each of the two input connections. Each such op amp includes two inputs, a first of which is connected to a reference voltage, and at least one output connected to the second of the amplifier's inputs to form an operational amplifier feedback loop which holds that second input at a virtual ground. The receiver further includes a separate resistor associated with each of the two input connections, connected between the input connection and the virtual ground at the second input of the input connection's associated amplifier, so that current in the operational amplifier feedback loop can flow through the resistor to the associated input connection to help hold the amplifier's virtual ground at its associated reference voltage. As a result, even if a voltage received at an input connection ranges outside the receiver's power supply voltage range, the voltage at the virtual ground input into the associated input amplifier will remain substantially constant, and, thus, within that power supply voltage range.

In some embodiments of this aspect of the invention the receiver is part of a transceiver which includes: transmitter circuitry including one or more output transistors for driving an output signal; and a pair of output connections for driving a center tapped transformer, with each connection of the pair having isolation circuitry for electrically isolating it from the transmitter circuitry during different portions of the output signal; circuitry for producing an output measurement signal as a function of the feedback currents in the two input amplifiers, which signal varies as a function of the differential voltage supplied between the input connections; and feedback circuitry for using a comparison between the output measurement signal and a desired signal level to control the amplitude of the output signal.

Some such transceivers are designed for a power supply voltage between ground and a given power voltage, and the transceiver is designed so that when the output connections and input connections are connected to opposite ends of a center tapped transformer and the transmitter circuitry drives the output signal, the voltages received at the input connections range on the opposite side of ground from the given power voltage.

According to some embodiments of the receiver of this aspect of the invention the input amplifier connected to a first of the input connections produces a first feedback current which is a function of the voltage of the first input connection. The input amplifier connected to a second of the input connections produces a second feedback current which is a function of the first feedback current minus a feedback current generated by the input amplifier which is proportional to the voltage of the second input connection. Circuitry is provided for producing an amplified input signal as a function of the second feedback signal.

According to some embodiments of this aspect of the invention each input amplifier has two outputs, with circuitry causing substantially equal current to flow in each output even if the load on those outputs differ. One of the outputs is connected to provide the feedback current necessary to maintain the virtual ground at the amplifier's second input, and the other output producing an equal current used for another purpose.

According to another aspect of the invention an operational amplifier is provided which has two inputs; two outputs; and circuitry for causing substantially equal current to flow in each of the two outputs even if the loads on them vary.

In some embodiments of this aspect of the invention the circuitry for causing substantially equal current to flow in each of the two outputs includes similar circuitry to drive each such output, including similar transistors connected to similar control voltages.

In some embodiments of this aspect of the invention the circuitry for causing substantially equal current to flow in each of the two outputs includes a separate complementary pair of output transistors driving each such output, with each output transistor of each such pair having a corresponding cascode transistor to cause its current to be less affected by variations in the voltage of each such complementary pair's output.

According to another aspect of the invention a transmitter for driving an output signal through a transformer is provided which includes: transmitter circuitry including one or more output transistors for driving the output signal; a pair of output connections from which the output signal can be connected across the transformer coil; circuitry for producing a measurement of current flow across one or more of the output transistors; and circuitry for substantially turning off current flow in the one or more output transistors for at least a given time period when the current measurement exceeds a given level.

In some embodiments of this aspect of the invention the transmitter is powered by a power supply having two voltage rails, and there are at least two complimentary pairs of the power transistors, each having two output transistors connected in series between the voltage rails with a node between them to which the pair's associated output connection is connected. The transmitter circuitry includes circuitry for driving the two complementary pairs, so that one pair can drive current in a first direction across the transformer during one part of an output signal cycle, and the other pair can drive current in an opposite direction across the transformer during another part of the output signal cycle. Each output transistor in each complementary pair has associated circuitry for producing the measurement of current flow across it. The circuitry for substantially turning off current flow in the one or more output transistors substantially turns off current flow in all of the output transistors in response to a measurement that current flow in any one of the output transistors exceeds a given level.

In some embodiments of this aspect of the invention at least a part of the transmitter is constructed as a single monolithic circuit. This monolithic circuit includes: the output transistors; at least part of the circuitry for measuring; and at least part the circuitry for substantially turning off are all on one semiconductor chip. In one such embodiment the monolithic circuit further includes: external connections for providing transistor drive signals to one or more external power transistors which can be used for driving an output signal across a transformer; an external current overflow connection for receiving an indication of a current overflow in one or more of the external power transistors; and circuitry for responding to such an indication of an external overflow by substantially turning off the transistor drive signals.

Some embodiments of this aspect of the invention are transceivers which include such a transmitter. Such transceivers further include: a pair of input connections for receiving an input signal from a transformer coil; and receiver circuitry for amplifying that input signal and producing an amplified input signal.

In some embodiments of this aspect of the invention the transmitter generates the output signal in response to a digital sequence of one or more successive output bits received from other circuitry; and the circuitry for substantially turning off current includes latching circuitry for keeping the current turned off, once it has been turned off, until the next end of a sequence of successive output bits is received from the other circuitry. The latching circuitry is reset after the next end of a sequence of successive output bits, so that a later sequence of successive output bits received from the other circuitry can cause the transmitter to generate another output signal.

In some embodiments of this aspect of the invention the circuitry for producing a measurement includes a current sensing resistor in series with the current flowing through one or more output transistors.

The invention also includes methods of operating transmitters, receivers, and/or transceivers which are similar to the methods of operation of the apparatus described above.

DETAILED DESCRIPTION OF THE PREFERRED EMBODIMENTS

Figure 1:
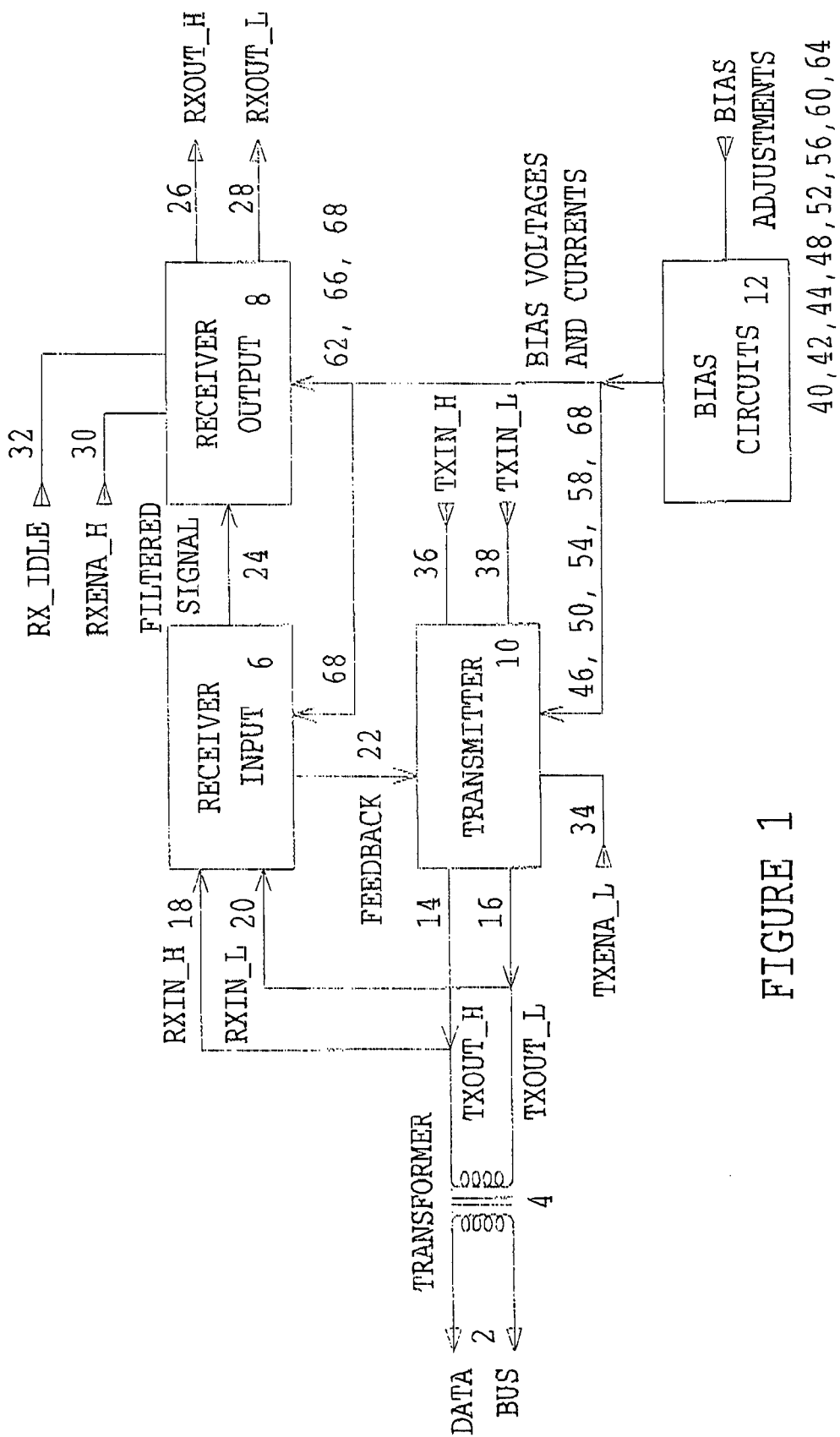
FIG. 1 is a block diagram showing the overall design of a transceiver according to one embodiment of the invention.

FIG. 1 shows an embodiment of the invention which is a transceiver IC designed to connect electronic equipment to a MIL-STD-1553 serial data bus. Other embodiments of the invention can be used with other types of data buses.

The transceiver of FIG. 1 consists of a receiver input section 6, a receiver output section 8, a transmitter section 10, and some common bias circuits 12 which supply bias currents and bias voltages 40–68 to the other sections, all of which are located on a monolithic integrated circuit. The transmitter and the receiver input are connected to the data bus 2 through a transformer 4. To meet a variety of different applications, the monolithic transceiver of FIG. 1 can be used with different types of transformers, as will be explained below.

Receiver Input Section:

Signals from the data bus 2 pass through the transformer 4 to RXIN_H 18 and RXIN_L 20 at the receiver input section 6. Details of the receiver input section are shown in FIG. 2.

The signal from RXIN_H 18 passes through weighting resistor 206 to a virtual ground 210 at the inverting input of an operational amplifier 200. The signal from RXIN_L 20 passes through an equal weighting resistor 208 to a virtual ground 212 at the inverting input of another operational amplifier 202. Both virtual grounds are held very close to the bandgap reference voltage BGREF 68 (about +2.4 volts, from the bias circuits) by feedback around the op amps.

Figure 2:
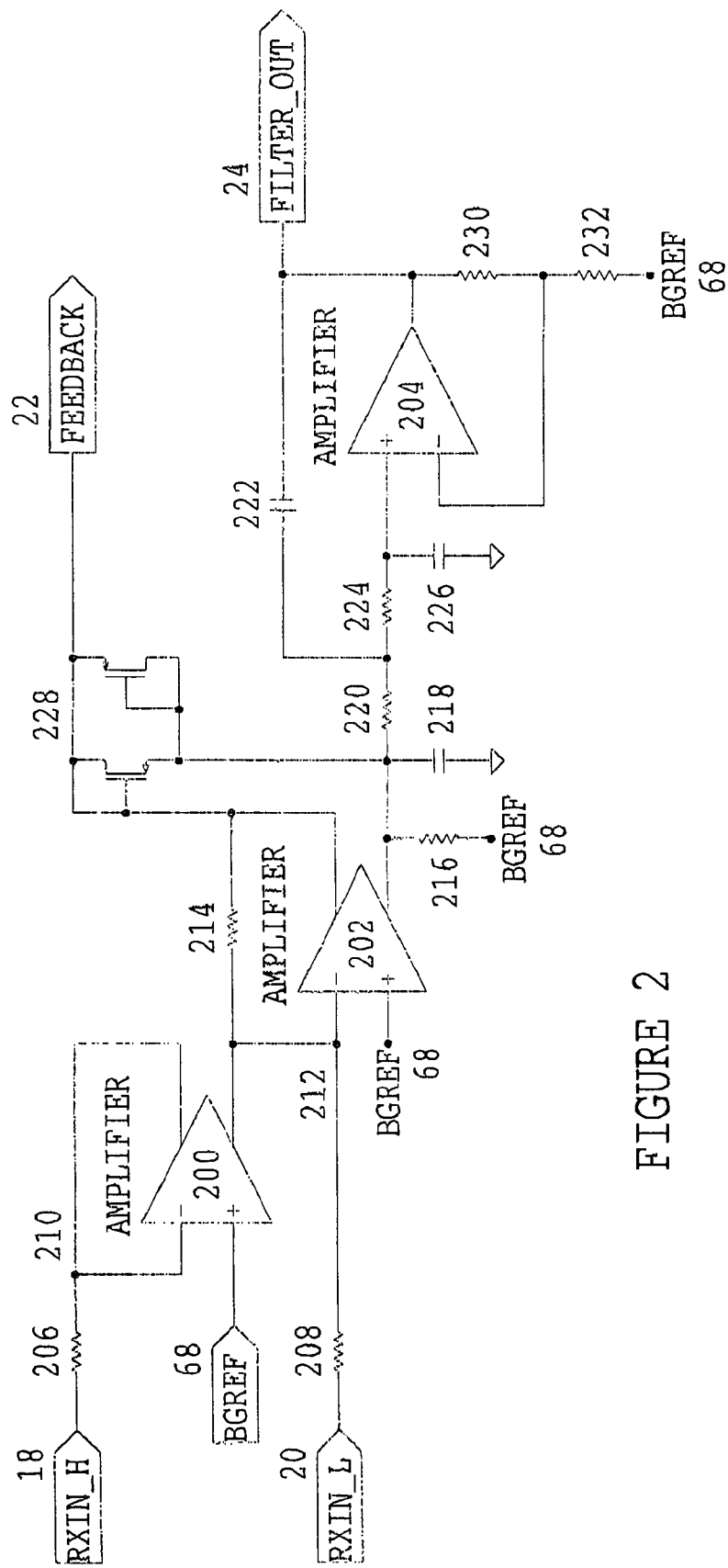
FIG. 2 is a detail of the receiver input section of the transceiver shown in FIG. 1.

Although it is not shown in FIG. 2, there are three different pairs of receiver input connections 18 and 20, each having a differently weighted corresponding pair of resistors 206 and 208. Each of these different pairs is designed to connect the receiver input to a different transformer.

Figure 3:
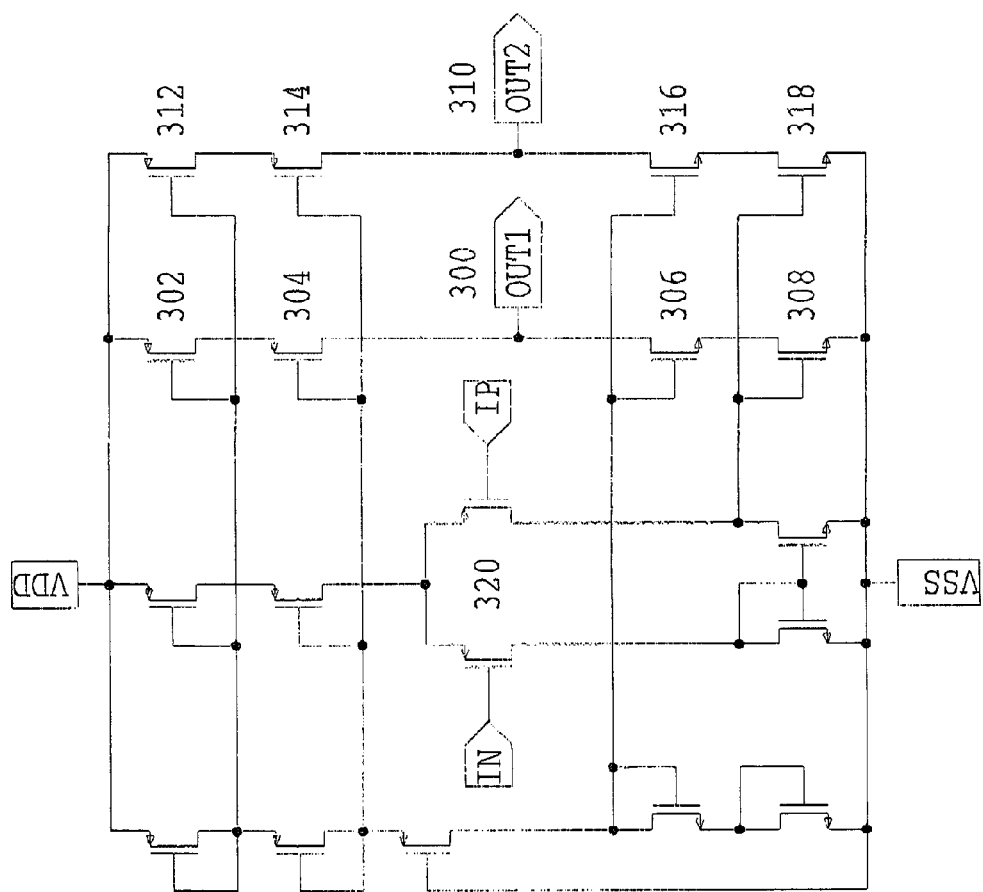
FIG. 3 is a schematic diagram of an operational amplifier with two outputs, corresponding to amplifiers 200 and 202 shown in FIG. 2.

200 and 202 are operational amplifiers each having two outputs with substantially identical output currents. A schematic diagram of this amplifier is shown in FIG. 3. The two outputs 300 and 310 are created by connecting the gates of identical transistors 302–308 and 312–318 in parallel to the same control inputs. Aside from the multiple outputs, the amplifier design is familiar to one skilled in the art: a differential pair 320 driving a common-source stage 308 and 318, with cascode current sources 302–304, 312–314, etc. The cascode transistors 304–306 and 314–316 cause the current flow through each of the op amp's outputs 300 and 310 be less affected by variations in voltage at those outputs. This tends to cause the currents which pass through these two outputs to be substantially identical, even if the loads on them vary considerably.

The first output of 200 must supply all of the current that passes through the weighting resistor 206 from RXIN_H 18. The second output of 200 delivers an identical current to the virtual ground 212 at the input of 202, where it subtracts from the current through the other weighting resistor 208 from RXIN_L 20, thus 200 acts as a current mirror. The first output of 202 must supply a current, through a feedback resistor 214, that is equal to the difference between the two input currents, thus 200 and 202 combine to act as a differential amplifier.

When the transmitter is operating, the transmitter output voltages TXOUT_H 14 and TXOUT_L 16 are seen at RXIN_H 18 and RXIN_L 20. This output voltage will vary depending on the type of transformer being used. As stated above, a separate pair of input connections 18 and 20, each with different resistors 206 and 208, is provided for each different transformer used with the transceiver. For any transformer, the two weighting resistors 206 and 208 are scaled so that the difference current at the virtual ground 212 is typically +/−0.5 mA when the transmitter output voltage is correct for the transformer being used. This scaling of the weighting resistors also compensates for the effect of the transformer on signals received from the data bus, so that that the receiver sees signals of consistent amplitude regardless of what transformer is being used.

Connecting the input connections RXIN_H and RXIN_L to the virtual grounds 210 and 212 created by the op amps 200 and 202 has the benefit of causing the voltages which reach the transistors of the receiver circuitry in FIG. 2 to remain within the voltage range of the unipolar power supply supplied to the transceiver of FIG. 1, even if voltages induced in the transformer connected to that transceiver go outside that range. This is particularly important if the transceiver is used with a center tapped transformer. This is because, when the transceiver first drives one half of the center tapped winding of such a transformer with the power supply voltage in one direction and then drives the other half of that winding with the same power supply voltage in another direction, the half of the transformer winding which is not being currently driven will have a voltage of the opposite polarity to that driving the other half induced in it. This will cause voltages received on one of the two input connections RXIN_H and RXIN_L to be below ground, and, thus, outside the voltage range of the transceiver's power supply during each half of each output signal cycle. The use of the virtual grounds 210 and 212 isolates all of the circuitry FIG. 2 except for portions of the resistors 206 and 208 from these out of range voltages.

The voltage at the first output of 202, labeled FEEDBACK 22, is sent to the transmitter section, where it is used to regulate the amplitude of transmitter output voltages. When the output voltage is correct for the transformer being used, FEEDBACK 22 is typically +/−1 volt.

The second output of 202 passes an identical current through resistor 216, which is at the input to a filter. The voltage drop across resistor 216 is much larger than the FEEDBACK signal 22, so a pair of clamping transistors 228 divert current away from 216 to limit the signal amplitude. The slew rate at this point is limited by a capacitor 218 in parallel with resistor 216.

A third operational amplifier 204 is used to implement an active filter which reduces the amount of noise in the filtered signal 24. This filter is the current-input equivalent of a standard voltage-input filter familiar to those skilled in the art. It is a three-pole low pass filter with a corner frequency near 3 MHz. The filtering is performed by a feedback network of resistors and capacitors 216–226. Another feedback network of two resistors 230–232 gives the filter a gain of two at low frequencies.

Receiver Output Section:

The filtered signal 24 from the receiver input section goes to the receiver output section 8. Details of the receiver output section are shown in FIG. 4.

Figure 4:
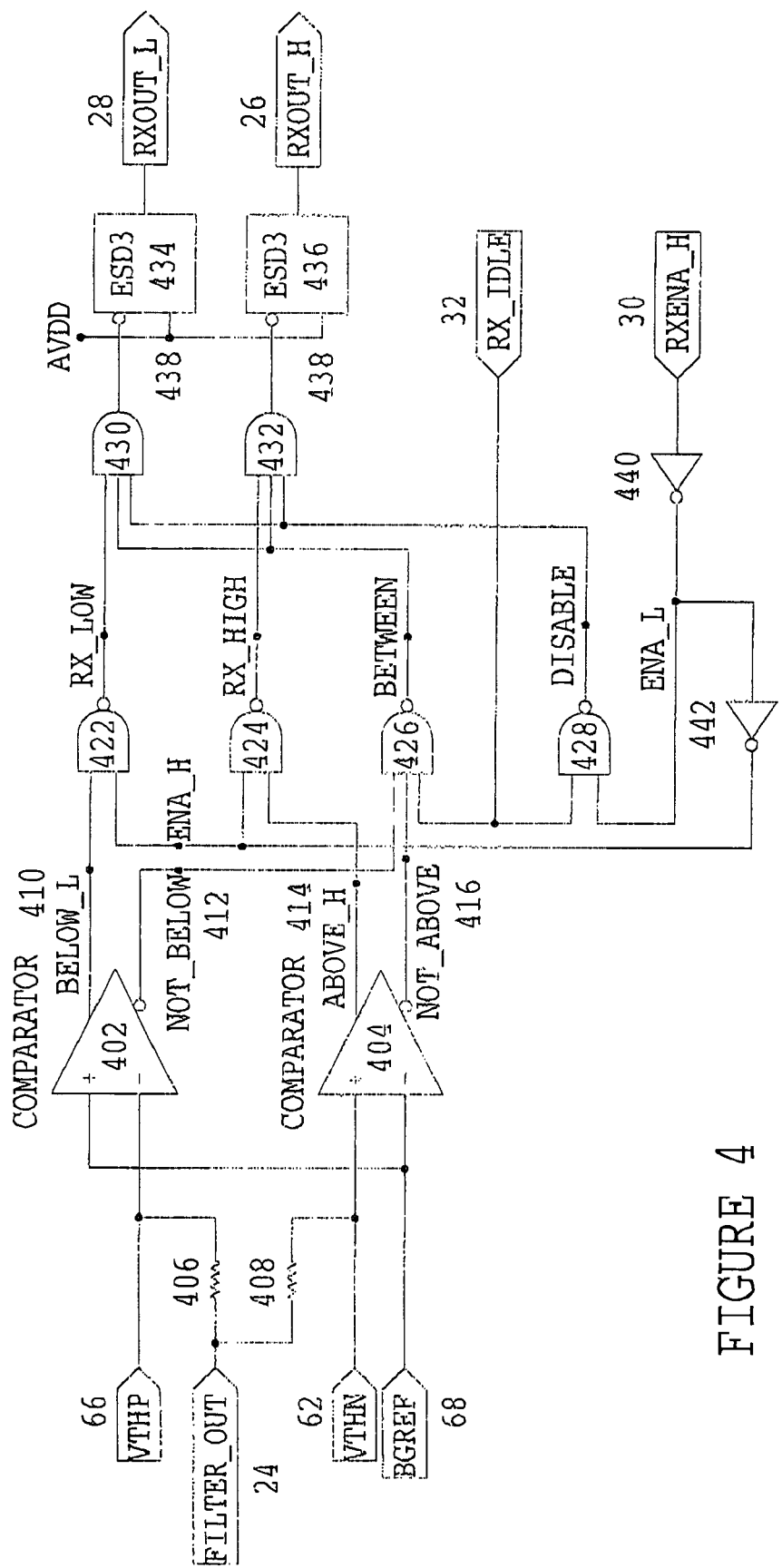
FIG. 4 is a detail of the receiver output section of the transceiver of FIG. 1.

As is shown in FIG. 4, the filter output signal 24 is compared to the bandgap reference voltage BGREF 68 by two comparators 402 and 404 with complementary outputs. A current of about 100 uA from the bias circuits 12, shown in FIGS. 1 and 12, passes through resistor 406 to set the connection VTHP 66 to the bias circuits to about 0.4 volts above the filter output voltage 24; another 100 uA current passes through resistor 408 to set the connection VTHN 62 to the bias circuits to about 0.4 volts below the filter output voltage 24. These currents set the input threshold voltages for positive and negative signals. If the filter output signal is below the negative threshold, comparator 402 will set BELOW_L 410 high; otherwise NOT_BELOW 412 will be high. If the signal is above the positive threshold, comparator 404 will set ABOVE_H 414 high; otherwise NOT_ABOVE 416 will be high.

If the receiver enable input RXENA_H 30, which, as is shown in FIG. 1, is a signal from outside the transceiver which can be used to control its operation, is high, the signals on BELOW_L 410 and ABOVE_H 414 will be passed to the receiver outputs RXOUT_L 28 and RXOUT_H 26 respectively. BELOW_L high will drive RX_LOW 422 low, which will drive RXOUT_L high. ABOVE_H high will drive RX_HIGH 424 low, which will drive RXOUT_H high.

If the filter output 24 is between the high and low threshold voltages, NOT_BELOW 412 and NOT_ABOVE 416 will both be high, and the outputs will be controlled by the RX_IDLE input 32, which, as is indicated in FIG. 1, is a signal from outside the transceiver which can be used to control its operation. RX_IDLE high will drive BETWEEN 426 low, which will drive both RXOUT_H and RXOUT_L high. RX_IDLE will also control the outputs if RXENA_H 30 is low; then RX_IDLE high will drive DISABLE 428 low, which will drive both RXOUT_H and RXOUT_L high.

Each of the receiver outputs 26 and 28 is driven by an output drive circuit 436 or 434, respectively. Each of these outputs is protected from electrostatic discharges (ESD) by two very large transistors 502 and 504, shown in FIG. 5, which divert surges of electric current into either the positive power supply or into ground. These ESD clamping transistors 502 and 504 also function as output drive transistors on the RXOUT_L and RXOUT_H lines, respectively.

Figure 5:
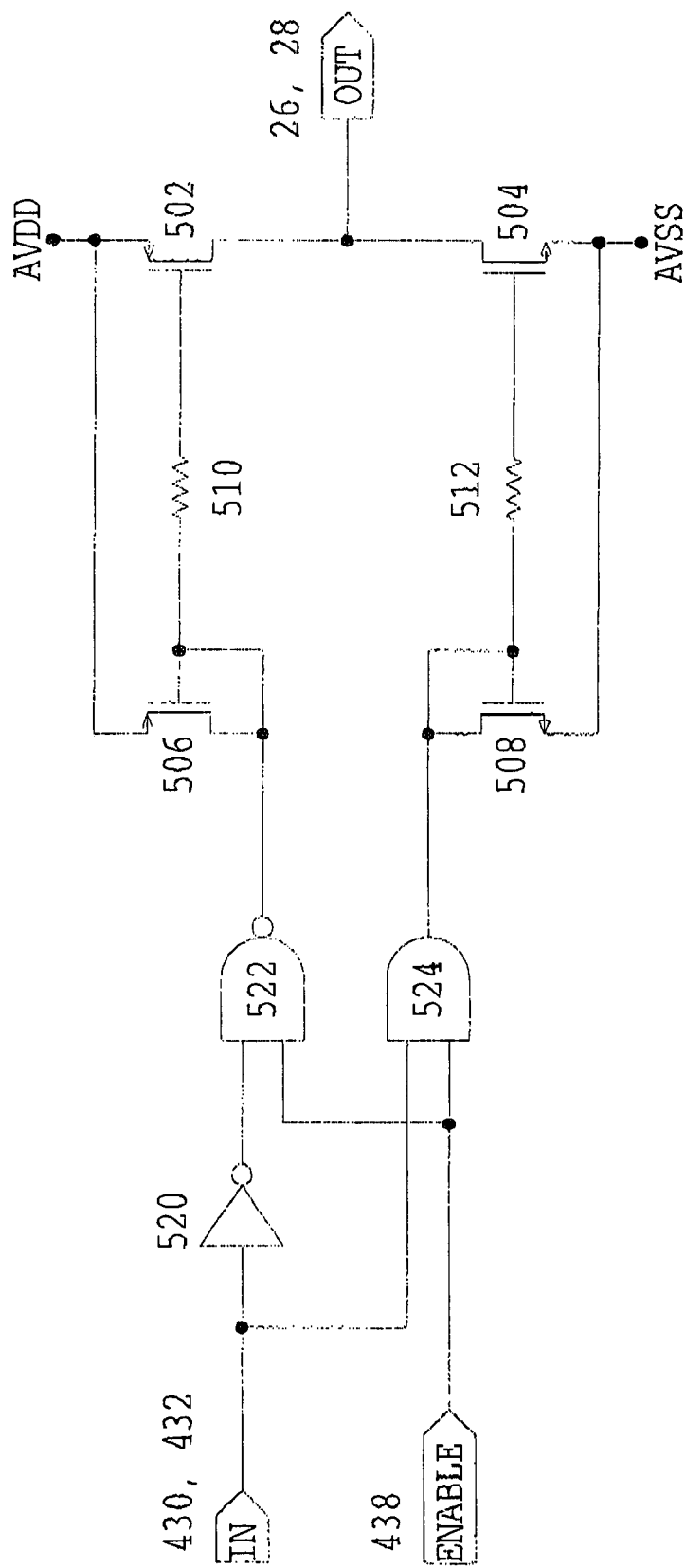
FIG. 5 is a detail of an output drive circuit, such as the circuits 434 and 436 shown in FIG. 4.

Details of the output drive circuits 434 and 436 are shown in FIG. 5.

Transistors 502 and 504 are the large transistors protecting the output. Transistors 506 and 508 are much smaller transistors, connected to the larger transistors to form current mirrors. Resistors 510 and 512 provide some additional protection against ESD currents.

Each output drive circuit has a signal input 430 or 432 and an enable input 438. If the signal input is low and the enable input is high, current will flow through transistor 506, making output transistor 502 conduct, which pulls the output, labeled 26 or 28 in FIG. 4, high. If the signal input and the enable input are both high, current will flow through transistor 508, making output transistor 504 conduct, which pulls the output 26 or 28 low. The maximum high or low output current can be set by adjusting the dimensions of transistor 506 or 508. If the enable input is low, all the transistors will be off, but transistor 502 will conduct if an ESD surge drives the output voltage above the positive supply voltage, and transistor 504 will conduct if an ESD surge drives the output voltage below ground.

Figure 6:
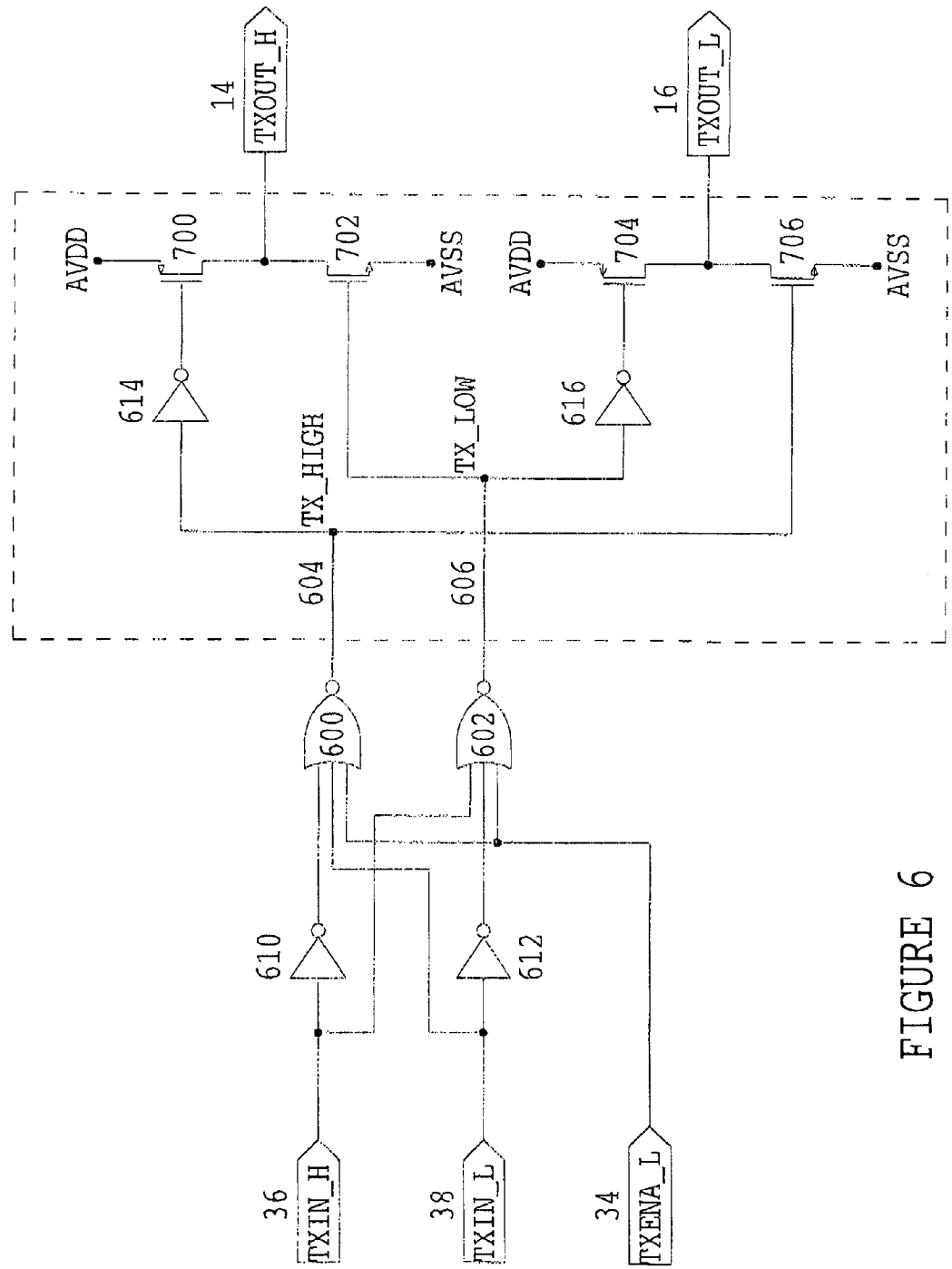
FIG. 6 illustrates the transmitter section of the transceiver of FIG. 1 in greater detail, with the portion of FIG. 7 encircled in dotted lines being shown in a highly simplified manner in that figure, and being shown with greater accuracy in FIGS. 7 and 8.

Transmitter Section:

FIG. 6 shows a greatly simplified version of the transmitter section. The portion of this figure which is shown encircled in dotted lines omits many features of the actual transmitter, to more simply explain the basic operation of the circuit. The four output drive transistors 700–706 are connected in a configuration that is sometimes referred to as an H-bridge, and are controlled by some input logic gates.

The transmitter input logic determines whether the transmitter has a valid command to drive its output high or low. Two NOR gates 600 and 602 monitor the transmitter inputs TXIN_H 36 and TXIN_L 38 and the transmitter enable input TXENA_L 34. If TXIN_H is high, TXIN_L is low, and TXENA_L is low, then there is a valid command to drive the transformer high, so NOR gate 600 will drive TX_HIGH 604 high. TX_HIGH will turn on transistors 700 and 706, driving TXOUT_H 14 high and TXOUT_L 16 low.

If TXIN_H is low, TXIN_L is high, and TXENA_L is low, then there is a valid command to drive the transformer low, so NOR gate 602 will drive TX_LOW 606 high. TX_LOW will turn on transistors 702 and 704, driving TXOUT_H 14 low and TXOUT_L 16 high.

For any other combination of input signals, no valid command is recognized. TX_HIGH 604 and TX_LOW 606 will both remain low. All four output transistors will remain off, and signals may be received from other transmitters on the data bus.

Figure 7:
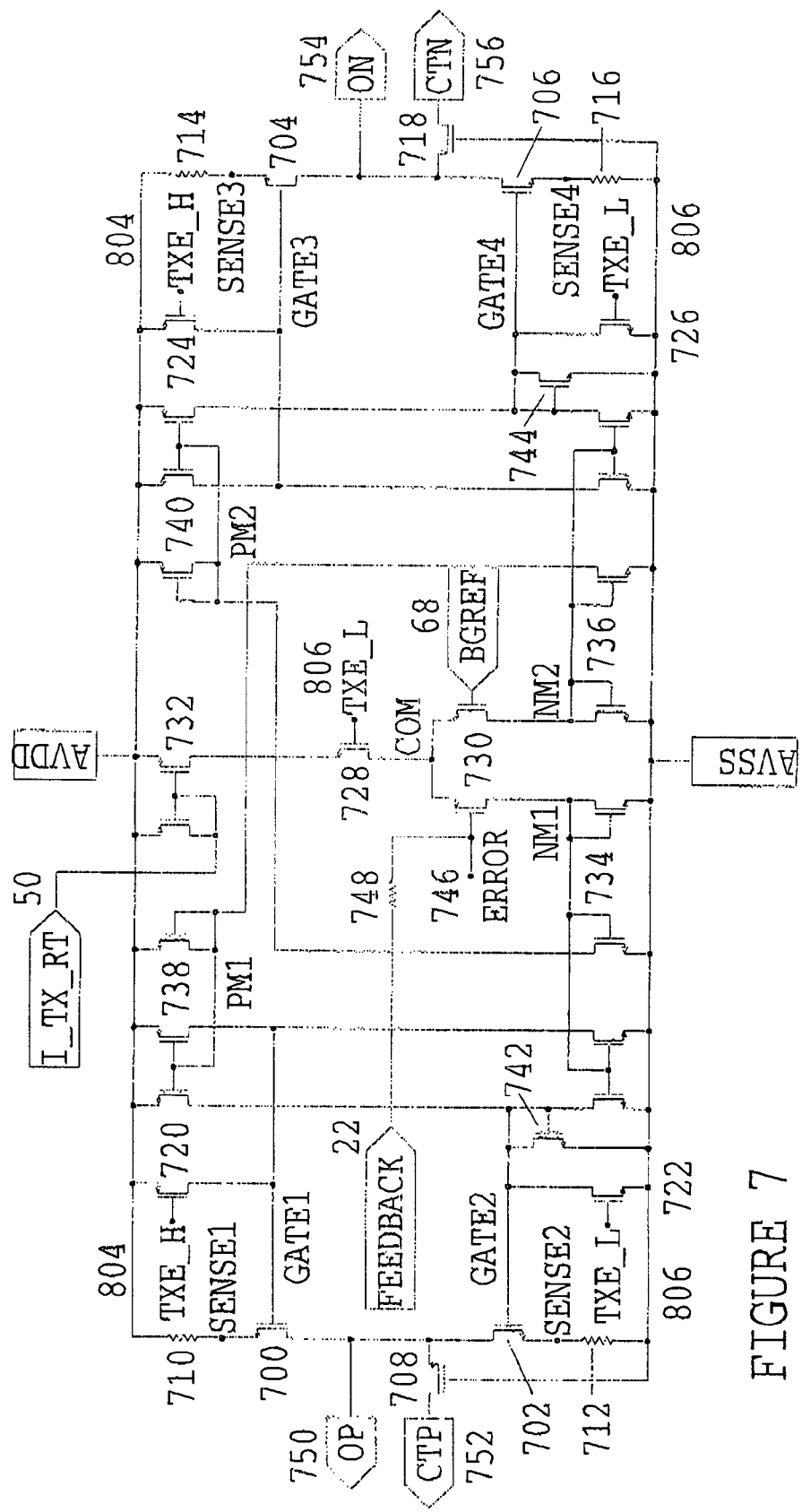
FIG. 7 is a schematic diagram of the transmitter section's output transistors and their drive circuitry.
Figure 8:
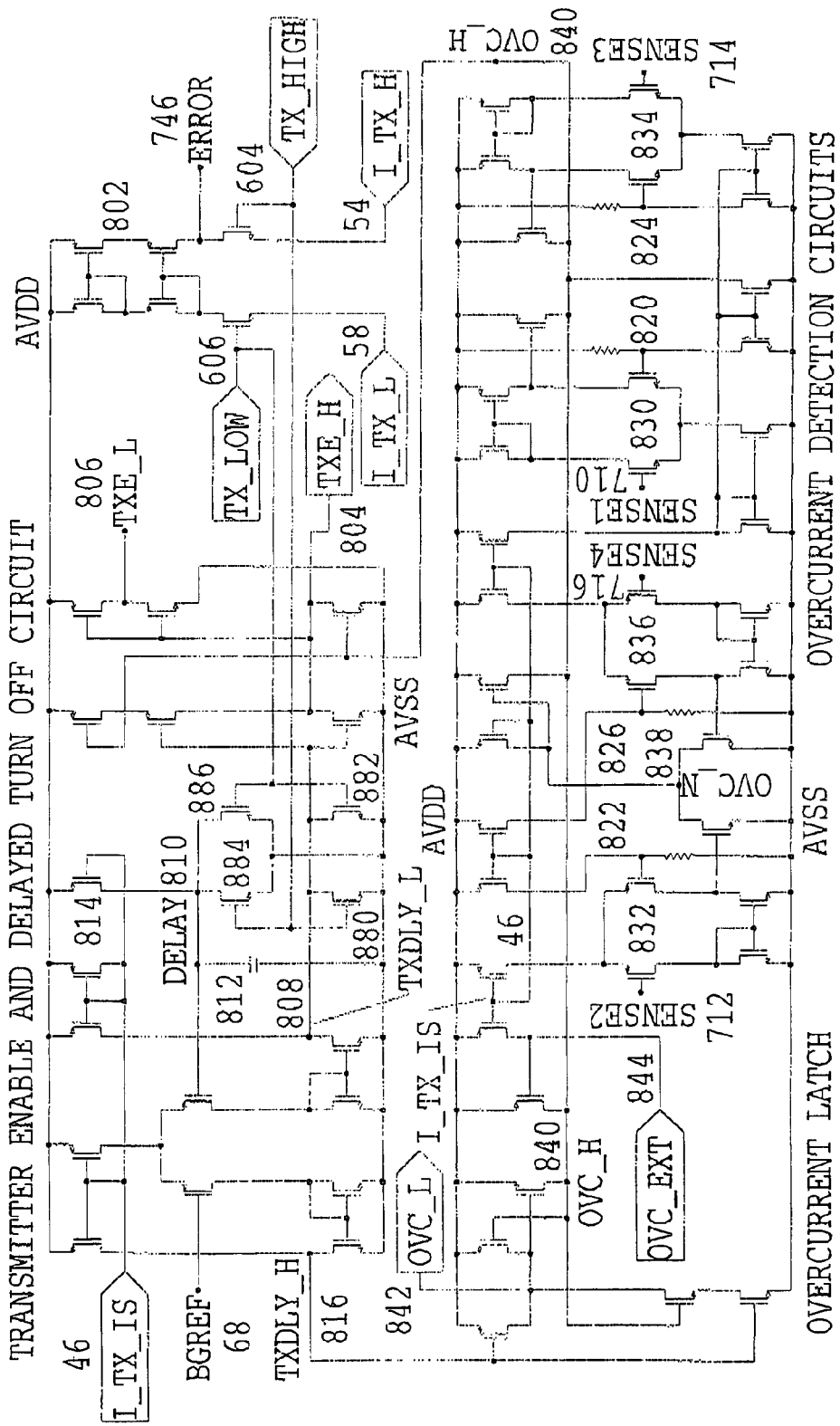
FIG. 8 is a schematic diagram of the transmitter section's transmitter enable circuits and overcurrent detection circuits.

As is indicated above, the portion of FIG. 6 which is shown encircled in dotted lines 603 is shown in a highly simplified, somewhat inaccurate, form to provide a quick overview of the basic function of the transmitter circuitry. FIGS. 7 and 8 provide a more detailed and accurate diagram of the circuitry corresponding to that shown within those dotted lines in FIG. 6. FIG. 7 is a detailed schematic diagram of the transmitter output transistors and their drive circuits. FIG. 8 shows the transmitter enable circuits and the overcurrent detection circuits.

Figure 12:
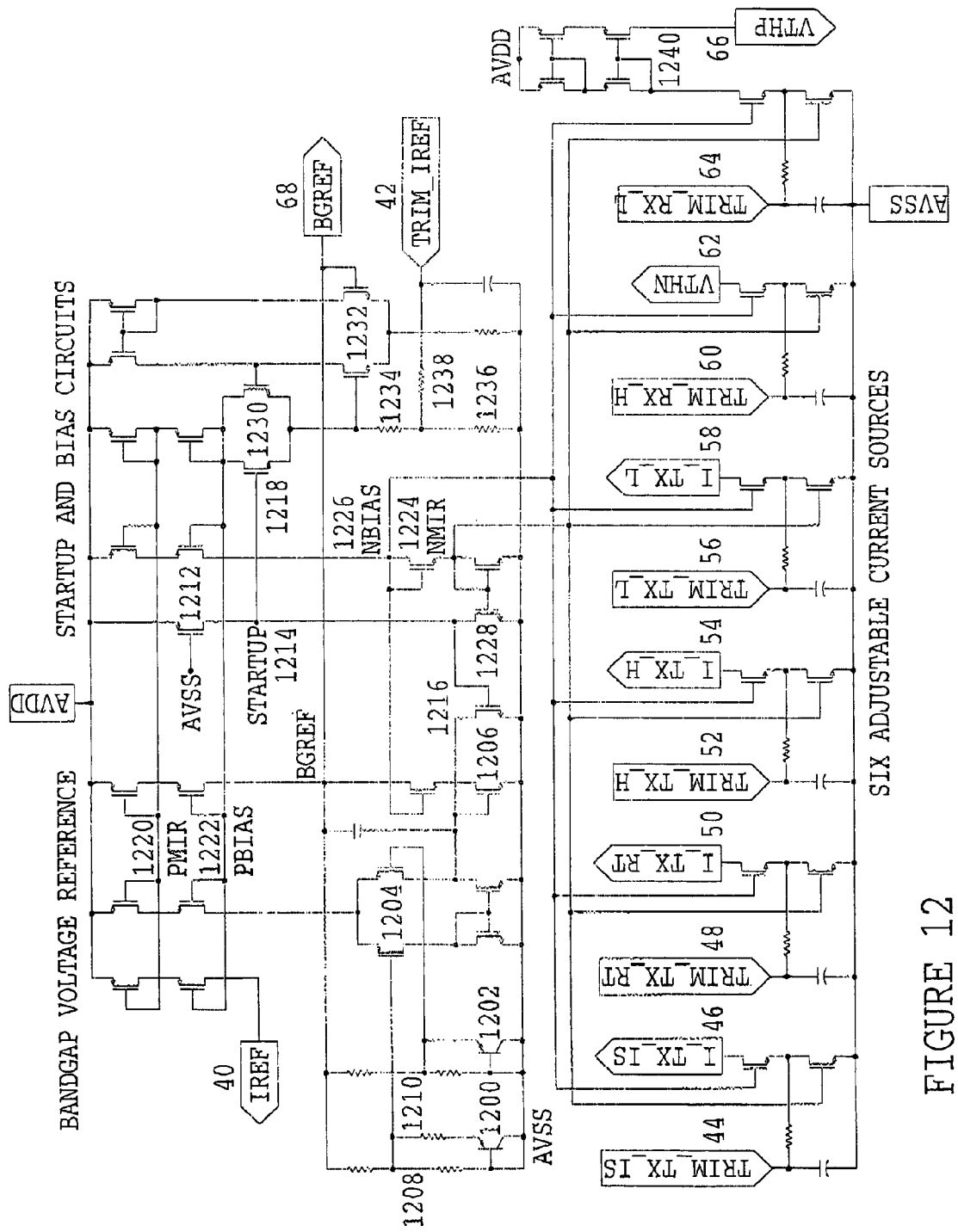
FIG. 12 is a schematic diagram of the common bias circuits which are used by the other sections of the circuitry shown in FIG. 1.

As shown in FIG. 7, the gates of the four main output drive transistors 700–706 are driven from the I_TX_RT current source 50 in the bias circuits section shown in FIGS. 1 and 12. This current is steered by a differential pair 730 and a series of current mirrors 732–740 to drive the gates of all four drive transistors. The drive transistors are very large, so they have large gate-to-source and gate-to-drain parasitic capacitances which are charged and discharged slowly by the gate drive current. The I_TX_RT current source is a constant current source, and it causes the current supplied to the gate of each output transistor by its corresponding current mirror to be substantially constant during a substantial portion of the time during which that current flows onto or off of each output transistor gate. Thus, the I_TX_RT current source causes the rise and fall of the transmitter output voltages and currents to occur at a relatively constant rate.

Each current mirror includes a turn-on transistor for supplying current to, and a turn-off transistor for drawing current from, the gate of its associated output transistor. The transistors of the current mirrors are weighted so the turn-off transistors pass current faster than the turn-on transistors. This causes one output transistor in each complementary output pair to be substantially shut off before the other transistor in that pair is substantially turned on, causing the output drive transistors 700–706 to exhibit a desirable "break-before-make" behavior which limits the current surges that flow while the drive transistors are switching.

If TX_HIGH 604 in FIG. 8 is high, the I_TX_H current source 54 in the bias circuits section will sink about 100 uA of current from the ERROR summing node 746 to ground. As is shown near the middle of FIG. 7, this current flows through resistor 748 to the FEEDBACK signal 22. The voltage drop across resistor 748 pulls ERROR 746 about one volt below BGREF 68, so the current from I_TX_RT 50, reflected through current mirror 732, is steered by the differential pair 730 into current mirrors 734 and 740. Mirror 734 turns transistor 702 off and transistor 700 on, pulling the OP output 750 high. Mirror 740 turns transistor 704 off and transistor 706 on, pulling output ON 754 low. Because N-channel transistors conduct more readily than P-channel transistors, a diode-connected transistor 744 is used to limit the gate voltage of transistor 706.

If TX_LOW 606 in FIG. 8 is high, the I_TX_L current source 58 in the bias circuits section will source about 100 uA of current to the ERROR summing node 746 from the positive power supply through a current mirror 802. As shown near the middle of FIG. 7, this current flows through resistor 748 to the FEEDBACK signal 22. The voltage drop across resistor 748 pulls ERROR 746 about one volt above BGREF 68, so the current from I_TX_RT 50, reflected through current mirror 732, is steered by the differential pair 730 into current mirrors 736 and 738. Mirror 738 turns transistor 700 off and transistor 702 on, pulling the OP output 750 low. Mirror 736 turns transistor 706 off and transistor 704 on, pulling output ON 754 high. Because N-channel transistors conduct more readily than P-channel transistors, a diode-connected transistor 742 is used to limit the gate voltage of transistor 702.

In either case, it takes about 200 nS for the gate drive current to charge and discharge the gate capacitances of the four output drive transistors 700–706. For a majority of this time the current flow to or from each of those transistor's gates is substantially constant. The circuitry which drives this gate current keeps it substantially constant over such a period by varying the voltage it uses to drive such current so as to compensate for factors which might otherwise cause such current to vary, such as changes in gate voltage as the power transistors' gates are charged or discharged.

After about 200 nS, the FEEDBACK signal 22 changes to reduce the difference between the ERROR 746 voltage and BGREF 68. As this difference between ERROR and BGREF gets small the current from I_TX_RT 50 will begin to divide between the current mirrors 734–740, which decreases the previously substantially constant currents which were charging or discharging the gates of the output transistors. When the transmitter output voltage approaches its final value, the difference between ERROR 746 and BGREF 68 is reduced ultimately to nearly zero, and the current from I_TX_RT 50 is divided equally among the gate drive current mirrors 734–740, which substantially stops the current flow to the gates of the output transistors.

It is important to note that the FEEDBACK signal 22 from the receiver input section depends on the differential voltage across the entire primary winding of the transformer, not on the voltage from one side of a center-tapped transformer to ground. Some prior art, including the Consi Patent previously mentioned, contains feedback to control the output voltage from one side of a center-tapped transformer to ground. But it is possible for a center tapped transformer to have primary windings that are not exactly equal, so that the two sides of the transformer need to be driven with slightly different voltages in order to avoid an unbalanced current flow through the transformer. The differential feedback used in the present invention can automatically compensate for this effect, thereby avoiding any DC current flow which might tend to distort the transmitted signals.

As is indicated in FIG. 7, when the transmitter is turned off, the transmitter enable signals TXE_H 804 and TXE_L 806 block the gate drive current at transistor 728, and the four transistors 720–726 force the gate-to-source voltage of each output drive transistor 700–706 to zero, thereby turning off all four output drive transistors.

When a valid TX_HIGH 604 or TX_LOW 606 command is received from the transmitter input logic, TXDLY_L 808 in FIG. 8 is pulled low, driving TXE_H 804 high and TXE_L 806 low to enable the four output drive transistors 700–706. DELAY 810 is also pulled low, discharging capacitor 812. As long as the intervals between valid TX_HIGH 604 and TX_LOW 606 commands are not long enough to permit capacitor 812 to charge up to the bandgap reference voltage BGREF 68 through transistor 814, which acts as a 25 uA current source, then TXDLY_L 808 remains low and the transmitter remains turned on. When no more TX_HIGH 604 or TX_LOW 606 commands are received, capacitor 812 charges up to BGREF 68 in about 400 nS, then TXDLY_L 808 rises and the transmitter turns off. This 400 nS delay before turning off the transmitter allows the transmitter output to return to zero volts under control of the feedback loop.

If any one of the four output drive transistors 700–706 exceeds about 1 Ampere of current, it will trip the overcurrent shutdown circuits. Each drive transistor is connected to a 0.2 ohm current sense resistor 710–716, shown in FIG. 7. The voltages SENSE1 to SENSE4 from each sense resistor 710–716 are compared to 0.2 volt reference voltages 820–826 by four dedicated comparator circuits 830–836 shown in FIG. 8. If comparator 832 or 836 detects excessive current in transistor 702 or 706, the comparator will pull OVC_N 838 low, which in turn pulls OVC_H 840 high. If comparator 830 or 834 detects excessive current in transistor 700 or 704, the comparator will pull OVC_H 840 high directly. If the external overcurrent input OVC_EXT 844 is pulled low, it will also pull OVC_H 840 high; this external input permits an external drive circuit to trip the overcurrent shutdown circuits.

The overcurrent shutdown circuits include latching circuitry which will keep the output drive transistors turned off during a sequence of successive output bits. Once OVC_H 840 is pulled high by one of the comparators 830–836, OVC_H will shut off TXE_H 804 and TXE_L 806, thereby turning off the four output drive transistors 700–706. OVC_H high will also force OVC_L 842 low. The OVC_H and OVC_L signals form a pair of cross-coupled NAND gates which latch the overcurrent signal. The latch is cleared when TXDLY_H 816 is pulled low by the transmitter enable circuit, after no TX_HIGH 604 or TX_LOW 606 commands have been received for about 400 nS. Thus if an overcurrent shutdown occurs during a sequence of successive output bits received from other circuitry, the transmitter will remain shut down until the end of the sequence of successive output bits. The latching circuitry is reset after the end of the sequence of successive output bits so that a later sequence of successive output bits received from other circuitry will cause the transmitter to generate another output signal. This has the advantage of protecting the output drive transistors from excessive currents, while permitting the transmitter to resume normal operation after the overcurrent problem has ended.

The transmitter output drive circuits can drive three different types of transformers, to meet a variety of different applications. In all cases, the secondary winding of the transformer is connected to the data bus.

As shown in FIG. 1, the transmitter uses the 5 volt power supply to drive a transformer 4 with a single primary winding; this is referred to as the 5 volt bridge connection. The 5 volt bridge connection uses the four output drive transistors 700–706 shown in FIG. 7 connected as an H-bridge. The transformer is connected to the pair of output connections marked OP 750 and ON 754 in FIG. 7.

Figure 9:
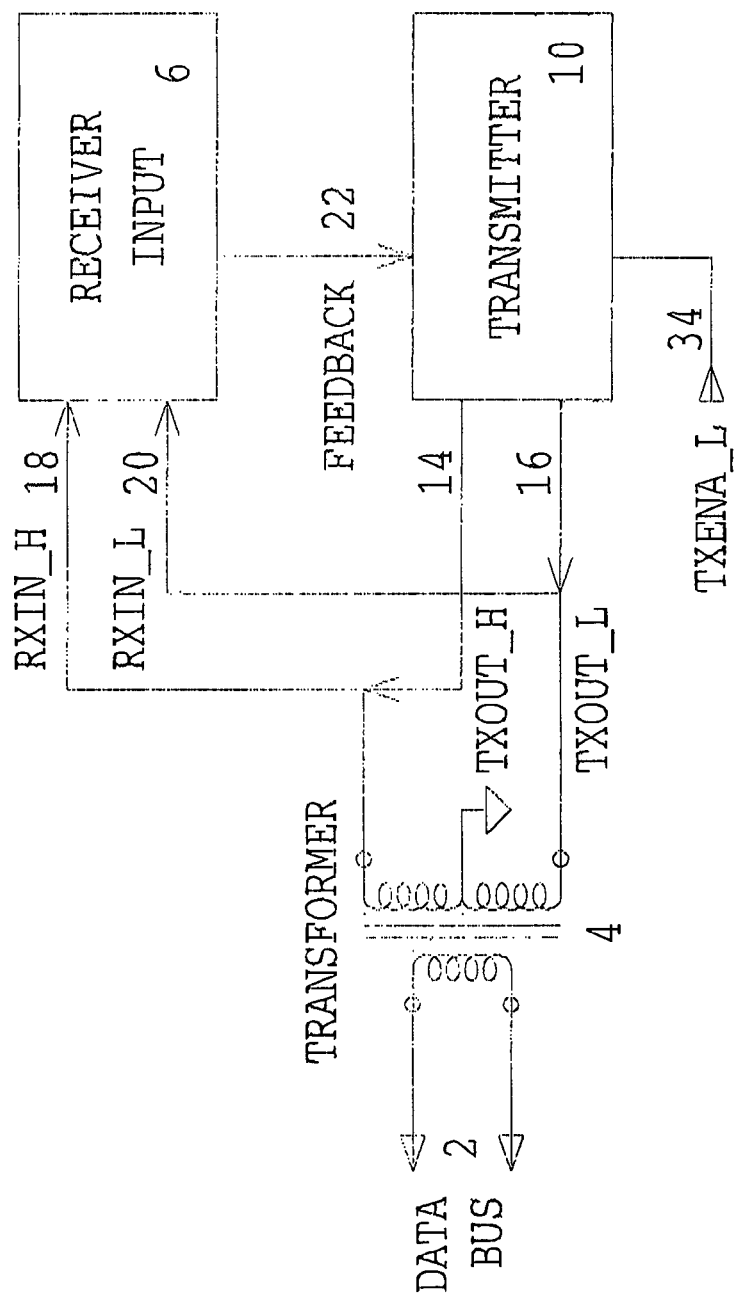
FIG. 9 illustrates how the circuitry of FIG. 1 can be connected to drive a 5 volt center-tapped transformer.

In FIG. 9, the transmitter uses the 5 volt power supply to drive a transformer 4 with a center-tapped primary winding (such as, for example, a Technitrol Q1553-45 or equivalent), where the center tap is connected to ground; this is referred to as the 5 volt center-tapped connection. The transformer is connected to the pair of output connections marked CTP 752 and CTN 756 in FIG. 7. The 5 volt center-tapped connection uses two additional transistors 708 and 718 with their gates grounded, as shown in FIG. 7. These additional transistors and their connection to ground, electrically isolate each of the output connections 752 and 756 from the rest of the transmitter circuitry when the voltage on such a connection goes below ground, so the CTP and CTN outputs can swing below ground in response to voltages induced in the currently un-driven half of the center tapped winding without having an adverse effect on the operation of the transmitter circuitry.

Figure 10:
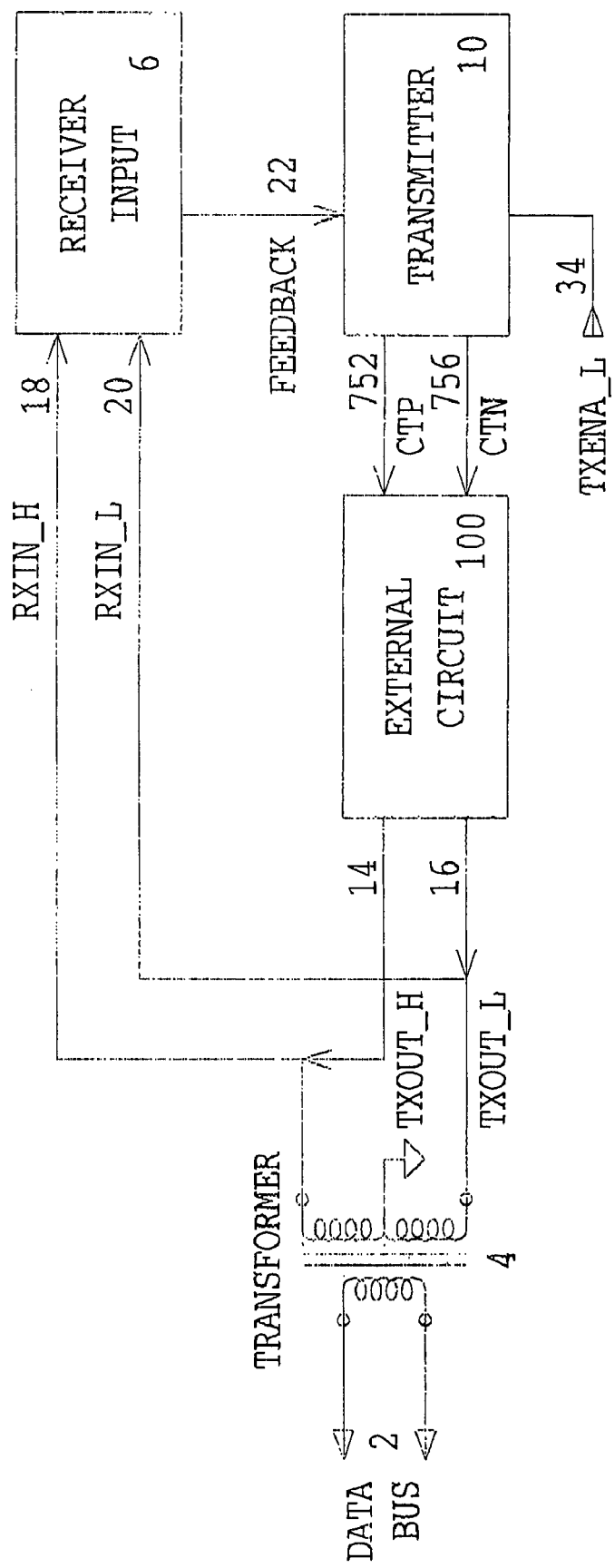
FIG. 10 illustrates how the circuitry of FIG. 1 can be connected to drive a 15 volt center-tapped transformer.

In FIG. 10, the transmitter is shown using an external circuit 100 operating on a +15 volt or −15 volt supply to drive a different transformer 4 with a center-tapped primary winding (which could be, for example, a Technitrol Q1553-2 or equivalent), where the center tap is also connected to ground; this is referred to as the 15 volt center-tapped connection. In the 15 volt center-tapped connection, the external drive circuit is connected to the pair of output connections CTP 752 and CTN 756, which are shown in both FIGS. 7 and 10.

Figure 11:
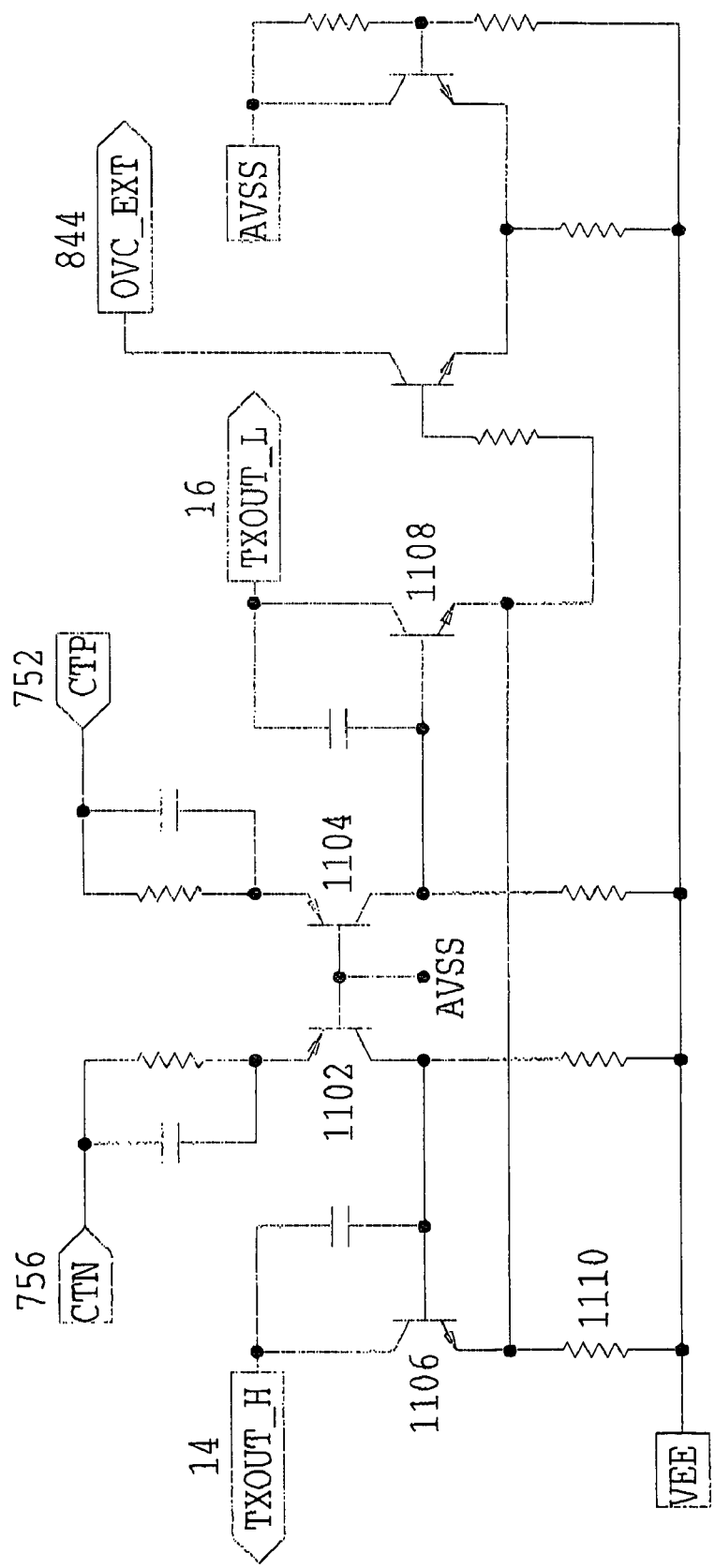
FIG. 11 is a schematic diagram of one possible external drive circuit for use with a 15 volt center-tapped transformer of the type shown in FIG. 10.

One possible embodiment of the external drive circuit 100 is shown in FIG. 11. Two transistors 1102 and 1104 shift the CTP and CTN output voltages down to the −15 volt VEE supply, where two other transistors 1106 and 1108 drive the transformer drive outputs TXOUT_H 14 and TXOUT_L 16. The external circuit contains an overcurrent shutdown circuit similar to the internal overcurrent shutdown circuits contained in the monolithic circuit. If the current through resistor 1110 exceeds about 0.3 ampere, the external overcurrent signal OVC_EXT 844 is pulled low to set the internal overcurrent latching circuitry in the monolithic circuit, thereby turning off the CTP and CTN outputs and shutting down the external drive circuit.

Bias Circuits Section:

FIG. 12 is a schematic diagram of the common bias circuits which are used by the other sections. These bias circuits include a bandgap voltage reference, a startup circuit, a bias current regulator, and several adjustable current sources.

The bandgap voltage reference circuit is familiar to one skilled in the art. Two transistors 1200 and 1202 have equal bias currents and unequal areas. The base-to-emitter voltage of each transistor has a negative temperature coefficient. The difference between their base-to-emitter voltages has a positive temperature coefficient. This difference voltage is amplified by differential pair 1204 and common source transistor 1206, and added to the base-to-emitter voltage to drive the bandgap reference voltage output BGREF 68. Feedback to the transistors is attenuated by two 2:1 voltage dividers 1208 and 1210, so that BGREF is approximately 2.4 volts.

The startup circuit operates only when the positive power supply voltage AVDD first turns on. As the power supply voltage rises above 1 volt, transistor 1212 pulls the STARTUP signal 1214 high. STARTUP turns transistor 1216 on, which keeps common source transistor 1206 turned off to allow the BGREF 68 voltage to rise, while transistor 1218 turns on to start bias currents flowing through several P-channel cascode current sources controlled by two bias voltages PMIR 1220 and PBIAS 1222. One of these bias currents flows through two N-channel transistors to create two additional bias voltages NMIR 1224 and NBIAS 1226. As all of these bias currents approach normal values, transistor 1228 pulls STARTUP 1214 low, turning transistors 1216 and 1220 off.

At this point, a bias current regulator circuit takes control of the bias currents. Differential pair 1232 drives transistor 1230, forcing the voltage at the top of resistor 1234 to equal BGREF 68. With 2.4 volts across resistors 1234 and 1236, the current through transistor 1230 into the bias circuits is approximately 100 uA.

The bias currents can be adjusted if desired, although such adjustments are not necessary for proper operation of the transceiver. The voltage at the TRIM_IREF input 42 is normally 1.2 volts. If TRIM_IREF is adjusted above or below 1.2 volts, a current will flow through resistor 1238 into either resistor 1234 or resistor 1236, so that the current through transistor 1230 can be trimmed to exactly 100 uA. To facilitate such trimming, an additional current source IREF 40 is provided where the actual bias current can be measured while making this adjustment.

Six adjustable current sources are connected to bias voltages NMIR 1224 and NBIAS 1226. These current sources can be trimmed above or below 100 uA by adjusting the voltage at their respective trim inputs in a manner similar to the TRIM_IREF input previously discussed. Each current source controls a different parameter of the transceiver, and each of these parameters can be adjusted by trimming its respective current source. VTHP 66 and VTHN 62 control the threshold voltages for low and high input signals in the receiver as shown in FIG. 4; VTHP also uses a current mirror 1240 to reverse its direction. I_TX_H 54 and I_TX_L 58 control the high and low signal output voltages from the transmitter; these are the currents that flow into the ERROR signal 746 in FIG. 8, which is compared to the FEEDBACK signal 22 in FIG. 7. I_TX_RT 50 controls the rise time of the output voltages from the transmitter; this is the current that charges and discharges the gates of the output drive transistors 700–706 in FIG. 7. I_TX_IS 46 controls the bias current sources shown in FIG. 8, and sets the current limiting threshold of the overcurrent detection circuits in the transmitter by controlling the four 0.2 volt reference voltages 820–826 used by the four dedicated comparator circuits 830–836 as shown in FIG. 8.

It should be understood that the foregoing description and drawings are given merely to explain and illustrate, and that the invention is not limited thereto except insofar as the interpretation of the appended claims are so limited. Those skilled in the art who have the disclosure before them will be able to make modifications and variations therein without departing from the scope of the invention.

In particular, it should be noted that this application explains the present invention in more detail than is common in many patent applications, by showing actual circuit schematics for one embodiment of the invention rather than just functional block diagrams having blocks corresponding to recited claim elements. The inventor hopes he will not be punished for providing the public with such a detailed teaching by having the scope of his claims limited to details shown in such schematics which would not be included in such functional block diagrams. Punishing a more detailed teaching of an invention with a more limited interpretation of the claims would be contrary to one of the primary purposes of the patent system, which is to reward inventors for teaching their inventions to the public. In this application, it is intended that each claim be interpreted just as broadly as if this specification had included a separate block diagram having blocks and connections corresponding to each of the claim's recited elements and relationships between elements. Since such block diagrams would add no information to the application, and since their number would greatly impede any reading of this application, an effort has been made to make this application more readable by excluding such diagrams.

Considerable thought has been put into the wording of the following claims so that they will provide an accurate description of the scope of what the inventor considers to be his invention, and it is hoped that the meaning of the claims will be interpreted from their own wording rather than from the particulars of the one or more embodiments of the invention described in the specification. For example, where a dependent claim includes limitations not contained in a parent claim, the parent claim is meant to be read as not including that limitation, unless common sense would require a contrary interpretation among those skilled in the relevant technical art.

In addition, those skilled in the electronic arts will understand that many of the circuits and circuit functions described in the claims, can be designed or performed in many different ways. Thus, the claims are not meant to be limited to the exact circuitry shown in the drawings. To cite just one of many possible examples, this application includes claims which recite "feedback circuitry for using a comparison between said received differential voltage and a desired signal level to control the amplitude of said output signal." Feedback circuits are well known in the electronic arts, and people skilled in those arts know what the above quoted language means and would be able to quickly design many very different circuits capable of achieving such feedback control which would come within the intent of such claim language. Thus, the claims should not be limited to the precise wiring of the corresponding circuitry shown in the figures.

In the embodiments of the invention discussed above, almost all of the various aspects of the invention are shown occurring together in one transceiver system. It should be understood that in other embodiments of the invention different subsets of one or more individually claimed aspects of the invention can occur in a given system. Here are just a few of many possible examples of this point: not all embodiments of some aspects of the invention need to be transceivers, some can be transmitters and some can be receivers; not all embodiments of aspects of the invention need have current overflow shut off circuitry; not all receiver circuitry needs to use operational amplifiers with feedback loops providing a virtual ground for receiving input from a transformer; and not all receiver circuitry which does use such op amps needs to use op amps which each have two outputs with substantially equal current.

It should be understood that some aspects of the invention are intended to cover a receiver, transmitter, or transceiver designed for use with a transformer, even when it is not currently connected to a transformer. Not all aspects of the invention are limited to use or intended use with transformers. Embodiments of some aspects of the invention could be designed to communicate through other media, such as RF transmissions, coaxial cables, twisted pair, fiber optics, just to name a few. In fact, some aspects of the invention relating to op amps with two outputs are not even limited to use on transmitters, receivers, or transceivers.

Some aspects of the invention recite the use of FET output or power transistors, but others do not and embodiments of such other aspects of the invention can use other types of transistors, such as bipolar transistors.

The op amps used in some aspects of the invention have two outputs each, but in other aspects of the inventions op amps having only one output can be used. For example, those skilled in the art will understand how each two-output op amp shown in FIG. 2 could be replaced by two single-output op amps.

According to some aspects of the invention, the outputs of the input op amps corresponding to amplifiers 200 and 202 of FIG. 2 could be combined in different ways to produce a signal which measures the differential voltage generated across the transceiver's transformer. For example, the outputs of each of the two input op amps could be supplied to two inputs of a differential amplifier to produce such a signal. Furthermore, in some embodiments, the input amplifier circuits could be other than operational amplifiers, and amplification could be of either voltage and/or current.

In the embodiment of the invention shown, virtually all of the components necessary for the transceiver, except its transformer, are provided in one monolithic integrated circuit. In embodiments of many aspects of the invention greatly different degrees of integration could be used.

As those skilled in the electronic arts will appreciate, in most cases electronic signals can be measured, or responded to, either based on their voltage or their current. Unless claims relating to a particular aspect of this invention make clear that one of the other of these two characteristics is to be used for such measuring or responding, it should be understood that either could be used.

In general, a statement in the claims that an element is connected to another element is not meant to require that they be directly connected. In many embodiments intermediary components could exist between such connected elements. For example, the recitation in some claims of a complementary pair of output transistors connected in series across a power supply is not meant to exclude the possibility of other components in series with them between those power rails.

The aspects of the invention that relate solely to operational amplifiers having two similar current outputs are not intended to be limited to use with a transmitter, receiver, or transceiver.

In many aspects of the invention relating to receiving an input signal generated across a transformer it is not necessary that the input signal be connected to virtual ground nodes, as is shown FIG. 2. Such inputs can be supplied to amplification circuitry using other previously known techniques for making such connection.

In the embodiment of the invention described above, a current overflow causes the transceiver's power transistors to be turned off and to remain off as long as a continuous sequence of bits is being supplied to the transceiver for transmission. In other embodiments of this aspect of the invention the current overflow circuitry could turn the power transistors off for different periods of time, such as, for example, a fixed period of time, or until the transceiver receives an external signal.

I claim:

1. A transceiver for driving and receiving a signal through a transformer comprising:
    an FET power transistor having an output contact for conducting current to a coil of a transformer, said power transistor having a control gate with a parasitic capacitance;
    a gate drive circuit which provides a controlled current flow to and from the gate so as to charge and discharge the gate and its parasitic capacitance, and so as to increase and decrease, respectively, the output current supplied by the output of the power transistor at a controlled rate;
    wherein said drive circuit controls said current flow by causing a voltage level that drives such current to compensate for changes in the voltage on the gate so as to make the rate at which such current flows substantially constant during said charging and discharging.

2. A transceiver as in claim 1, further comprising:
    a second FET power transistors, having an second output contact for conducting current to the coil of the transformer, and a second control gate with a parasitic capacitance; and
    a second gate drive circuit which provides a controlled current flow to and from the second control gate of the second FET so as to charge and discharge the second control gate and its parasitic capacitance, and so as to increase and decrease, respectively, the output current supplied by the second FET power transistor at a controlled rate;
    wherein the first FET power transistor drives current across said transformer in a first direction during one part of an output signal cycle, and the second FET power transistor for driving current across said transformer with a second, opposite, direction during another part of said output signal cycle.

3. A transceiver as in claim 2 wherein:
    each of said first and second power transistors is one transistor of a first and second complimentary pair of power transistors, respectively; and
    each complimentary pair includes two power transistors connected in series across a power supply with an associated one of said output contacts connected between them.

4. A transceiver as in claim 2 wherein each of said gate drive circuits uses a substantially constant current source to charge its associated control gate during at least a portion of the charging of that gate.

5. A transceiver as in claim 2 further including:
a receiver input circuit having:
   a pair of input connections for connection to each side of said transformer coil and for receiving the voltage differential across that coil; and
   circuitry for providing an output measurement signal which varies as a function of said received voltage differential; and
a feedback circuit for controlling when to stop said current flow to said control gate of one of said power transistors driving current across said transformer when said output measurement signal indicates said received voltage differential has reached a desired level.

6. An output circuit for driving a signal comprising:
an FET power transistor having an output contact, said power transistor having a control gate with a parasitic capacitance;
a gate drive circuit that provides a controlled current flow to and from the gate to charge and discharge the gate and its parasitic capacitance, so as to increase and decrease, respectively, the output signal supplied by the output of the power transistor at a controlled rate, said drive circuit controlling said current flow by causing a voltage level that drives such current to compensate for changes in the voltage on the gate so as to make the rate at which such current flows substantially constant during said charging and discharging; and
feedback circuitry that senses said output signal and substantially stops current flow to or from said control gate when it senses that said output signal has reached a desired level.

7. An output circuit as in claim 6, further comprising:
a second FET power transistor having a second output contact and a second control gate with a parasitic capacitance; and
a second gate drive circuit that provides a controlled current flow to and from the second control gate to charge and discharge the second control gate and its parasitic capacitance so as to increase and decrease respectively the output signal supplied by the second output of the second FET power transistor at a controlled rate, said second drive circuit controlling said current flow by causing a voltage level that drives such current to compensate for changes in the voltage on the second control gate so as to make the rate at which such current flows substantially constant during said charging and discharging;
wherein the first FET power transistor drives current corresponding to said signal from the first output contact in a first phase, and the second FET power transistor drives current corresponding to said signal from the second output contact in a second phase.

8. An output circuit as in claim 7 wherein said feedback circuitry senses a voltage difference between the two differently phased outputs and substantially stops the flow of current to or from the control gate on one or more of said two power transistors when it senses that said voltage difference has reached a desired level.

9. An output circuit as in claim 7 wherein each of said gate drive circuits uses a substantially constant current source to charge its associated control gate during at least a majority of the time spent charging that gate.

10. A transceiver for driving and receiving a signal through a transformer comprising:
a pair of input connections for receiving an input signal from a transformer coil;
receiver circuitry for amplifying said input signal and producing an amplified input signal;
transmitter circuitry including one or more output transistors for driving an output signal;
pairs of output connections from which said output signal can be connected across said transformer coil, including a first pair for driving a center tapped transformer and a second pair for driving a bridge transformer;
a center tapped transformer; and
feedback circuitry for using a comparison between said amplified input signal and a desired signal level to control the amplitude of said output signal generated by said transmitter circuitry;
wherein:
   said first pair of output connections are connected across a center tapped transformer to drive said output signal across that transformer; and
   said pair of input connections are connected across said center tapped transformer to receive the differential voltage across that transformer as said input signal.

11. A transceiver as in claim 10 wherein at least a part of said transceiver is constructed as a single monolithic circuit including:
said input connections;
at least part of said receiver circuitry;
at least part of said transmitter circuitry; and
said first and second pair of output connections.

12. A transceiver as in claim 10 wherein:
each of said first pair of output connections has isolation circuitry for electrically isolating it from the transmitter circuitry when the voltage on said first pair of output connections goes below ground; and
the output connections of said second pair of output connections do not have such isolation circuitry.

13. A transceiver as in claim 12 wherein the transceiver's circuitry is designed to only operate on a single polarity power supply.

14. A transceiver as in claim 10 wherein:
said transceiver is powered by a power supply having a given power supply voltage range;
said receiver circuitry includes for each of said input connections an associated resistor and input operational amplifier;
each such input connection is connected through its associated resistor to a virtual ground at one input to its associated input amplifier; and
the virtual ground at one input of each input amplifier is maintained through feedback current from the amplifier's output that causes a variable voltage drop through the associated resistor as the voltage on the amplifier's associated input connection varies, so that even if a voltage received at an input connections ranges outside the power supply voltage range, the voltage at the virtual ground input into the associated input amplifier will remain substantially constant, and, thus, within the power supply voltage range.

15. A transceiver as in claim 14:
wherein said receiver circuitry includes circuitry for using said input amplifier feedback currents to generate an amplified input signal which varies as a function of the differential voltage across the transformer to which the input connections are connected; and further including an output control feedback loop for responding to the difference between said amplified input signal and a desired signal level to control the amplitude of said output signal.

16. A transceiver for driving and receiving a signal through a transformer, comprising:
a pair of input connections for receiving an input signal from a transformer coil;
receiver circuitry for amplifying that input signal and producing an amplified input signal;
transmitter circuitry including one or more output transistors for driving an output signal;
pairs of output connections for connecting said output signal across said transformer coil, including a first pair for driving a center tapped transformer and a second pair for driving a bridge transformer;
feedback circuitry for using a comparison between said amplified input signal and a desired signal level to control the amplitude of said output signal; and
a center tapped transformer;
wherein:
each output connection of said first pair of output connections has isolation circuitry for electrically isolating said output connections from said transmitter circuitry when the voltage on such a connection goes below ground;
said second pair of output connections do not have such isolation circuitry;
said first pair of output connections are connected across the center tapped transformer to drive said output signal across that transformer; and
said pair of input connections are connected across said center tapped transformer to receive the differential voltage across that transformer as said input signal.

17. A transceiver for both driving and receiving signals through a center tapped transformer including the transmitter, comprising:
a pair of input connections for connection across the center tapped winding so as to receive the differential voltage across said winding;
transmitter circuitry including one or more output transistors for driving an output signal;
a pair of output connections from which said output signal is connected across the center tapped winding of said transformer, where each output connection of said pair has isolation circuitry for electrically isolating said output connection from the transmitter circuitry during a different portion of the output signal;
feedback circuitry for using a comparison between said received differential voltage and a desired signal level to control the amplitude of said output signal; and
receiver circuitry connected to said pair of input connections for producing an amplified input signal which varies as a function of said received differential voltage.

18. A transmitter for driving an output signal through a transformer having a center tapped winding, said transmitter comprising:
a pair of input connections for connection across the center tapped winding so as to receive the differential voltage across said winding;
transmitter circuitry including one or more output transistors for driving an output signal;
a pair of output connections from which said output signal can be connected across the center tapped winding of said transformer, where each output connection of said pair has isolation circuitry for electrically isolating it from the transmitter circuitry during a different portion of the output signal; and
feedback circuitry for using a comparison between said received differential voltage and a desired signal level to control the amplitude of said output signal;
wherein:
said one or more output transistors are FET transistors each having an output contact and a control gate with a parasitic capacitance;
said transmitter circuitry includes a gate drive circuit that provides a controlled current flow to and from the gate of each output transistor to charge and discharge that gate and its parasitic capacitance, so as to increase and decrease, respectively, the output signal supplied by the output contact of the output transistor, said drive circuit controlling said current flow by causing the voltage level that drives such current to compensate for changes in the voltage on the gate so as to make the rate at which such current flows more even during said charging and discharging; and
said feedback circuitry substantially stops the flow of said current to or from said control gate as a function of said comparison between said received differential voltage and the desired signal level.

19. A receiver for receiving a signal generated across a winding of a transformer, said receiver comprising:
a pair of input connections for receiving a differential voltage input from opposite sides of said transformer winding;
a separate operational amplifier associated with each of said two input connections including:
two inputs, a first of which is connected to a reference voltage;
at least one output connected to the second of said amplifier's inputs to form an operational amplifier feedback loop which holds that second input at a virtual ground;
a separate resistor associated with each of said two input connections, connected between said input connection and the virtual ground at the second input of the input connection's associated amplifier, so that current in the operational amplifier feedback loop can flow through said resistor to the associated input connection to help hold the amplifier's virtual ground at its associated reference voltage;
wherein said receiver is designed to be powered by a power supply providing electrical power having a certain power supply voltage range; and
whereby even if a voltage received at an input connections ranges outside the power supply voltage range, the voltage at the virtual ground input into the associated input amplifier will remain substantially constant, and, thus, within the power supply voltage range.

20. A transceiver including the receiver of claim 19 further including:
transmitter circuitry including one or more output transistors for driving an output signal;
a pair of output connections for driving a center tapped transformer, with each connection of said pair having isolation circuitry for electrically isolating said connection from such transmitter circuitry during different polarities of the output signal;
circuitry for producing an output measurement signal as a function of the feedback currents in said two input amplifiers, which signal varies as a function of the differential voltage supplied between the input connections; and feedback circuitry for using a comparison between said output measurement signal and a desired signal level to control the amplitude of said output signal.

21. A transceiver as in claim 20 wherein:

the transceiver is designed for a power supply voltage range between ground and a given power voltage; and said transceiver is designed so that when said output connections and input connections are connected to opposite ends of a center tapped transformer and said transmitter circuitry drives said output signal, the voltages received at said input connections range on the opposite side of ground from said given power voltage.

22. A receiver as in claim 19:

wherein:

the input amplifier connected to a first of the input connections produces a first feedback current which is a function of the voltage of the first input connection; and the input amplifier connected to a second of the input connections produces a second feedback current which is a function of the first feedback current minus a feedback current generated by said input amplifier which is proportional to the voltage of the second input connection; and further including circuitry for producing an amplified input signal as a function of the second feedback signal.

23. A receiver as in claim 19 wherein each input amplifier has two outputs, with circuitry causing substantially equal current to flow in each output even if the loads on those outputs differ, with one of the outputs connected to provided the feedback current necessary to maintain the virtual ground at the amplifier's second input, and the other output producing an equal current used for another purpose.

24. A transmitter for driving an output signal through a transformer, comprising:

transmitter circuitry including one or more output transistors for driving said output signal;

a pair of output connections from which said output signal is connected across said transformer coil;

circuitry for producing a measurement of current flow across one or more of said output transistors; and circuitry for substantially turning off current flow in said one or more output transistor for at least a given time period when said current measurement exceeds a given level;

wherein:

said transmitter is powered by a power supply having two voltage rails;

there are at least two complimentary pairs of said power transistors, each having two output transistors connected in series between said voltage rails with a node between them to which the pair's associated output connection is connected;

the transmitter circuitry includes circuitry for driving said two complementary pairs, so that one pair can drive current in a first direction across said transformer during one part of an output signal cycle, and the other pair can drive current in an opposite direction across said transformer during another part of the output signal cycle;

each output transistor in each complementary pair has associated circuitry for producing said measurement of current flow across it; and said circuitry for substantially turning off current flow in said one or more output transistors substantially turns off current flow in all of said output transistors in response to a measurement that current flow in any one of said output transistors exceeds a given level.

25. A transmitter as in claim 24 wherein at least a part of said transmitter is constructed as a single monolithic circuit including:

said output transistors;

at least part of said circuitry for measuring; and at least part said circuitry for substantially turning off are all on one semiconductor chip.

26. A transmitter for driving an output signal through a transformer comprising:

transmitter circuitry including one or more output transistors for driving said output signal;

a pair of output connections from which said output signal is connected across said transformer coil;

circuitry for producing a measurement of current flow across one or more of said output transistors; and circuitry for substantially turning off current flow in said one or more output transistor for at least a given time period when said current measurement exceeds a given level;

wherein at least a part of said transmitter is constructed as a single monolithic circuit including:

said output transistors;

at least part of said circuitry for measuring;

at least part said circuitry for substantially turning off are all on one semiconductor chip;

external connections for providing transistor drive signals to one or more external power transistors which can be used for driving an output signal across a transformer;

an external current overflow connection for receiving an indication of a current overflow in one or more of said external power transistors; and circuitry for responding to such an indication of an external overflow by substantially turning off said transistor drive signals.

27. A transceiver including the transmitter of claim 24, said transceiver further including:

a pair of input connections for receiving an input signal from a transformer coil; and receiver circuitry for amplifying that input signal and producing an amplified input signal.

28. A transmitter for driving an output signal through a transformer comprising:

transmitter circuitry including one or more output transistors for driving said output signal;

a pair of output connections from which said output signal is connected across said transformer coil;

circuitry for producing a measurement of current flow across one or more of said output transistors; and circuitry for substantially turning off current flow in said one or more output transistor for at least a given time period when said current measurement exceeds a given level;

wherein:

said transmitter generates said output signal in response to a digital sequence of one or more successive output bits received from other circuitry;

said circuitry for substantially turning off current includes latching circuitry for keeping the current turned off, once it has been turned off, until the next end of a sequence of successive output bits is received from said other circuitry; and said latching circuitry is reset after said next end of said sequence of successive output bits, so that a later sequence of successive output bits received from said other circuitry can cause said transmitter to generate another output signal.

29. A transmitter as in claim 24—wherein said circuitry for producing a measurement includes a current sensing resistor in series with the current flowing through one or more output transistors.

30. A method of operating a transceiver for driving and receiving a signal through a transformer which has two ends and a plurality of FET power transistors, each having an associated output contact for conducting current to a coil of a transformer and an associated control gate with a parasitic capacitance, said method comprising:
connecting at each end of the transformer one of the output contacts of the FET power transistors; and
providing at different times controlled current flows to and from the respective gates of the connected FET power transistors so as to charge and discharge the gates and their respective parasitic capacitances and so as to increase and decrease, respectively, the output currents supplied by the respective output contacts of the connected FET power transistors at a controlled rates, a first of the connected FET power transistors driving current across said transformer in a first direction during one part of an output signal cycle and a second of the connected FET power transistors driving current across said transformer with a second opposite direction during another part of said output signal cycle;
wherein said current flows are controlled by causing voltage levels that drives such currents to compensate for changes in the voltages on the respective gates so as to make the rate at which such currents flows substantially constant during said charging and discharging.

31. A method as in claim 30 wherein:
each of said first and second connected FET power transistors is one transistor of a first and second complimentary pair of power transistors, respectively, the other power transistor of each complimentary pair of power transistors has an associated output contact and an associated control gate with a parasitic capacitance;
the power transistors of each complimentary pair are connected in series across an associated power supply with an associated one of said output contacts of one of the complimentary pair of power transistors connected between them; and
said limited current flows are provided to the respective control gate of each of said power transistors of each complimentary pair.

32. A method as in claim 30 wherein a substantially constant current source is used to charge the respective control gates of each of said power transistors of each complimentary pair during at least a portion of the charging of that gate.

33. A method as in claim 30 wherein:
said transceiver has a receiver input circuit;
a pair of input connections from the receiver input circuit are connected to each side of said transformer coil for receiving a voltage differential across that coil; and
the receiver input circuitry provides an output measurement signal which varies as a function of said received voltage differential; and
a feedback circuit controls when to stop said current flow to said control gate of one of said power transistors driving current across said transformer when said output measurement signal indicates said received voltage differential has reached a desired level.

34. A method of operating an output circuit for driving a signal with a first FET power transistor and a second FET power transistor each having an output contact and a control gate with a parasitic capacitance, so a differently phased version of the signal is supplied to each output contact, said method comprising:
providing a limited current flow to and from the respective control gates of the first FET power transistor and a second FET power transistor to charge and discharge the control gates and their respective parasitic capacitances, so as to increase and decrease, respectively, an output signal supplied by each output contact of the power transistor at a controlled rate, the first FET power transistors driving current corresponding to said signal from the output contact of said first power transistor in a first phase, and the second FET power transistors driving current corresponding to said signal from the output contact of said second power transistor in a second phase;
sensing the signal on each of said output contacts; and
stopping the current flow to or from each such control gate in response to the sensing of said signal.

35. A method as in claim 34 wherein said sensing senses a voltage difference between the two outputs of the differential signal and stops current flow to or from the control gate on one or more of said two power transistors when it senses that said voltage difference has reached a desired level.

36. A method as in claim 34 wherein a substantially constant current source is used to charge each of said control gates during at least a majority of the time spent charging that gate.

37. A method of operating a transceiver for driving and receiving a signal through a transformer, where said transceiver includes:
a pair of input connections for receiving an input signal from a transformer coil;
receiver circuitry for amplifying that input signal and producing an amplified input signal;
transmitter circuitry including one or more output transistors for driving an output signal; and
pairs of output connections from which said output signal can be connected across said transformer coil, including a first pair for driving a center tapped transformer and a second pair for driving a bridge transformer;
said method comprising:
connecting said pair of input connections across a given transformer which is either a center trapped transformer or bridge transformer; and
selecting to connect said first pair of output connections across said given transformer if it is a center tapped transformer and to connect said second pair of output connections across said transformer if it is a bridge transformer.

38. A method as in claim 37 wherein at least a part of said transceiver is constructed as a single monolithic circuit including:
said input connections;
at least part of said receiver circuitry;
at least part of said transmitter circuitry; and
said first and second pair of output connections.

39. A method as in claim 38 further including the steps of:
electrically isolating each of said first pair of output connections from the transmitter circuitry during a different portion of the output signal; and not electrically isolating either of said second pair of output connections during any portion of the output signal.

40. A method as in claim 39 wherein the transceiver's circuitry operates on a single polarity power supply.

41. A method as in claim 38 wherein:
said transceiver is powered by a power supply having a given power supply voltage range;
said receiver circuitry includes for each of said input connections an associated resistor and input operational amplifier;
each such input connection connects through its associated resistor to a virtual ground at one input to its associated input amplifier; and
the virtual ground at one input of each input amplifier is maintained through feedback current from the amplifier's output that causes a variable voltage drop through the associated resistor as the voltage on the amplifier's associated input connection varies, so that even if a voltage received at an input connections ranges outside the power supply voltage range, the voltage at the virtual ground input into the associated input amplifier will remain substantially constant, and, thus, within the power supply voltage range.

42. A method as in claim 41:
wherein said receiver circuitry uses said input amplifier feedback currents to generate an amplified input signal which varies as a function of the differential voltage across the transformer to which the input connections are connected; and
the transceiver controls the amplitude of said output signal in response to the difference between said amplified input signal and a desired signal level.

43. A method of operating a transmitter for driving an output signal through a transformer having a center tapped winding, said method comprising:
using transmitter circuitry including one or more output transistors to drive an output signal;
using a pair of output connections to connect said output signal across the center tapped winding of said transformer;
electrically isolating each output connection of said pair from the transmitter circuitry during a different portion of the output signal;
using a pair of input connections connected across the center tapped winding to receive the differential voltage across said winding; and
using a comparison between said received differential voltage and a desired signal level to control the amplitude of said output signal;
wherein:
said transmitter is part of a transceiver for sending and receiving signals through the center tapped transformer; and
said method uses receiver circuitry connected to said pair of input connections to produce an amplified input signal which varies as a function of said received differential voltage.

44. A method of operating a transmitter for driving an output signal through a transformer having a center tapped winding, said method comprising:
using transmitter circuitry including one or more output transistors to drive an output signal;
using a pair of output connections to connect said output signal across the center tapped winding of said transformer;
electrically isolating each output connection of said pair from the transmitter circuitry during a different portion of the output signal;
using a pair of input connections connected across the center tapped winding to receive the differential voltage across said winding; and
using a comparison between said received differential voltage and a desired signal level to control the amplitude of said output signal;
wherein:
said one or more output transistors are FET transistors each having an output contact and a control gate with a parasitic capacitance;
a controlled current flow to and from the gate of each output transistor is used to charge and discharge that gate and its parasitic capacitance, so as to increase and decrease, respectively, the output signal supplied by the output contact of the output transistor, said current flow being controlled by causing the voltage level that drives such current to compensate for changes in the voltage on the gate so as to make the rate at which such current flows substantially constant during said charging and discharging; and
said comparison between received differential voltage and a desired signal level is used to substantially stop said current to or from said control gate as a function of said comparison.

45. A method of operating a receiver for receiving a signal generated across a winding of a transformer, said method comprising:
using a pair of input connections to receive a differential voltage input from opposite sides of said transformer winding;
using a separate operational amplifier to receive a signal from each of said two input connections, wherein each of said operational amplifiers includes:
two inputs, a first of which is connected to a reference voltage; and
at least one output connected to the second of said amplifier's inputs to form an operational amplifier feedback loop which holds that second input at a virtual ground;
using a separate resistor associated with each of said two input connections, connected between said input connection and the virtual ground at the second input of the input connection's associated amplifier, to create a signal which varies as variable amounts of current pass from the operational amplifier feedback loop to the associated input connection, so as to help hold the amplifier's virtual ground at its associated reference voltage;
wherein said receiver is powered by a power supply providing electrical power having a certain power supply voltage range; and
whereby even if a voltage received at an input connection ranges outside the power supply voltage range, the voltage at the virtual ground input into the associated input amplifier will remain substantially constant, and, thus, within the power supply voltage range.

46. A method as in claim 45 wherein:
said receiver is part of a transceiver for both sending and receiving signals generated across transformer winding;
said transformer winding is the center tapped winding of a center tapped transformer; and said method further includes:
- using transmitter circuitry having one or more output transistors to drive an output signal; and
- using a pair of output connections to deliver the output signal across said center tapped winding;
- electrically isolating each of said pair of output connections from such transmitter circuitry during different polarities of the output signal;
- producing an output measurement signal as a function of the feedback currents in said two input amplifiers, which signal varies as a function of the differential voltage supplied between the input connections; and
- using a comparison between said output measurement signal and a desired signal level to control the amplitude of said output signal.

47. A method as in claim 46 wherein:
the transceiver is powered by a power supply voltage range between ground and a power voltage;
said transmitter circuitry:
- only drives said winding with voltages within said power supply voltage range;
- only drives one half of said winding at a time; and
- drives a different half of said winding in a different direction at different portions in said output signal; and the side of said winding which is not driven in a given portion of the output signal has induced into it a voltage of a polarity opposite to that supplied by the output signal to the side of the winding which is being driven, causing the voltage sensed at the input connection connected to the un-driven side of the winding to be on the opposite side of ground from the power voltage.

48. A method as in claim 45 wherein:
the input amplifier connected to a first of the input connections produces a first feedback current which is a function of the voltage of the first input connection; and the input amplifier connected to a second of the input connections produces a second feedback current which is a function of the first feedback current minus a feedback current generated by said input amplifier which is proportional to the voltage of the second input connection; and said method further includes producing an amplified input signal as a function of the second feedback signal.

49. A method as in claim 45 wherein:
each input amplifier has two outputs, and uses circuitry to cause substantially equal current to flow in each of those outputs even if the loads on those two outputs differ;

one of those outputs is used to provide the feedback current necessary to maintain the virtual ground at the amplifier's second input; and the other of those outputs produces an equal current which is used in the receiver for another purpose.

* * * * *